(12) United States Patent
Sato et al.

(10) Patent No.: US 12,172,845 B2
(45) Date of Patent: Dec. 24, 2024

(54) CYLINDRICAL BODY AND APPARATUS

(71) Applicant: CANON KABUSHIKI KAISHA, Tokyo (JP)

(72) Inventors: Tomonori Sato, Kanagawa (JP); Yohei Doi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 153 days.

(21) Appl. No.: 17/936,651

(22) Filed: Sep. 29, 2022

(65) Prior Publication Data

US 2023/0097168 A1    Mar. 30, 2023

(30) Foreign Application Priority Data

Sep. 30, 2021   (JP) ................................. 2021-161937

(51) Int. Cl.
 B21C 37/10   (2006.01)
 B65G 39/02   (2006.01)
 G02B 7/10    (2021.01)

(52) U.S. Cl.
 CPC .............. B65G 39/02 (2013.01); B21C 37/10 (2013.01); G02B 7/10 (2013.01)

(58) Field of Classification Search
 CPC ....... B65G 39/02; B21C 37/10; B21C 37/101; G02B 7/10; F16L 9/02
 USPC ............................ 193/37; 138/165, 168, 169
 See application file for complete search history.

(56) References Cited

U.S. PATENT DOCUMENTS

| | | | | |
|---|---|---|---|---|
| 3,301,992 | A | * | 1/1967 | Seeloff .................. B23K 33/00 |
| | | | | 219/67 |
| 6,745,448 | B2 | * | 6/2004 | Kondou ................ B21C 37/108 |
| | | | | 72/51 |
| 10,276,334 | B2 | * | 4/2019 | Meier .................... H01H 33/04 |
| 2008/0121008 | A1 | | 5/2008 | Yanokura et al. |
| 2011/0135370 | A1 | | 6/2011 | Matsuyama et al. |

FOREIGN PATENT DOCUMENTS

| | | |
|---|---|---|
| JP | S63207415 A | 8/1988 |
| JP | H04105709 A | 4/1992 |
| JP | H04118191 A | 4/1992 |
| JP | H07214144 A | 8/1995 |
| JP | H08120346 A | 5/1996 |
| JP | H09300084 A | 11/1997 |
| JP | 2000137154 A | 5/2000 |
| JP | 3699779 B2 | 9/2005 |
| JP | 2007047624 A | 2/2007 |
| JP | 2011121682 A | 6/2011 |
| JP | 2012-020867 A | 2/2012 |
| JP | 2016030274 A | 3/2016 |
| JP | 2020179958 A | 11/2020 |

* cited by examiner

*Primary Examiner* — Douglas A Hess
(74) *Attorney, Agent, or Firm* — Canon U.S.A., Inc. I.P. Division

(57) ABSTRACT

A cylindrical body includes a cylindrical member, made by forming a metal plate into a cylindrical shape such that the two end faces of the metal plate face each other, and a nonmetallic adhesive member bonding the two end faces together. The two end faces each include an adhesive part, and the adhesive member is disposed between the adhesive parts of the end faces. The adhesive part of one end face is not parallel to the adhesive part of the other end face. Each end face also includes a contact part which is in contact with the contact part of the other end face.

21 Claims, 10 Drawing Sheets

CYLINDRICAL BODY AND APPARATUS

BACKGROUND

Field of the Disclosure

The present disclosure relates to a cylindrical body and an apparatus.

Description of the Related Art

A cylindrical body is able to be manufactured at low cost by forming a metal plate into a cylindrical shape. Japanese Patent Laid-Open No. 2011-121682 describes a manufacturing method for a conveying roller formed in a cylindrical shape by facing a pair of end faces of a metal plate.

With the cylindrical body described in Japanese Patent Laid-Open No. 2011-121682, the strength may not be sufficient.

SUMMARY

The present disclosure provides an advantageous technology to enhance the strength of a cylindrical body. A first aspect of the present disclosure provides a cylindrical body and includes a cylindrical member made by forming a metal plate, the metal plate having a first end face and a second end face, into a cylindrical shape such that the first end face and the second end face of the metal plate face each other, and a nonmetallic adhesive member bonding the first end face to the second end face. The adhesive member is disposed between a first part of the first end face and a second part of the second end face, and the first part and the second part are not parallel to each other.

A second aspect of the present disclosure provides a cylindrical body including a cylindrical member made by forming a metal plate, the metal plate having a first end face and a second end face, into a cylindrical shape such that the first end face and the second end face of the metal plate face each other, and a nonmetallic adhesive member bonding the first end face to the second end face. The adhesive member is disposed between a first part of the first end face and a second part of the second end face, and a third part of the first end face is in contact with a fourth part of the second end face.

Further features of the present disclosure will become apparent from the following description of exemplary embodiments with reference to the attached drawings.

DESCRIPTION OF THE EMBODIMENTS

Figure 1A:
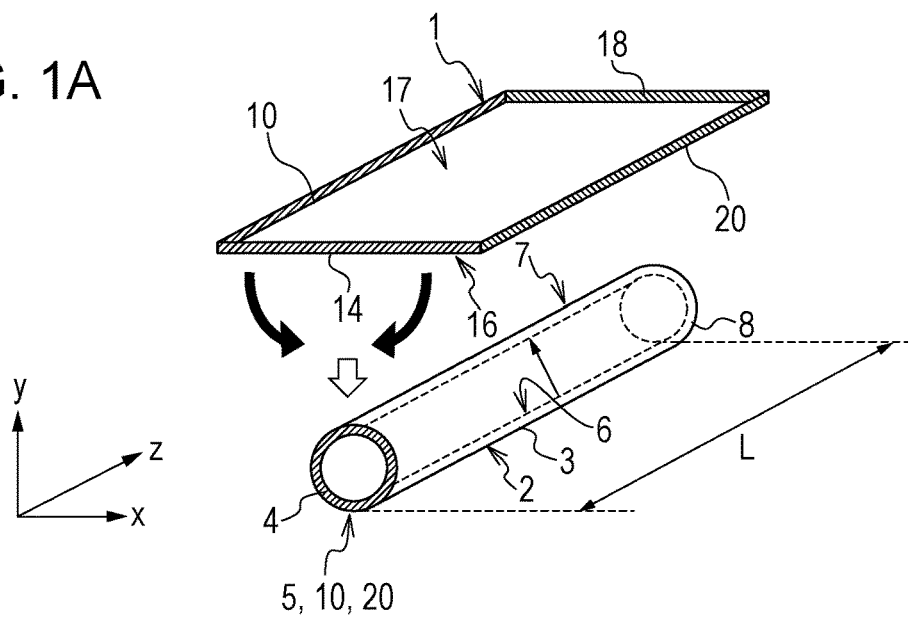
FIGS. 1A to 1C are schematic diagrams illustrating a cylindrical body.

Hereinafter, an embodiment of the present disclosure will be described with reference to the attached drawings. In the following description and the drawings, like reference signs are assigned to common components over a plurality of the drawings.

Therefore, common components will be described with reference to a plurality of drawings, and the description of components with common reference signs will not be repeated as needed.

A cylindrical body 2 according to the present embodiment will be described with reference to FIG. 1A. The cylindrical body 2 includes a cylindrical member 3 made by forming a metal plate 1, having an end face 10 and an end face 20, into a cylindrical shape such that the end face 10 and the end face 20 of the metal plate 1 face each other. The cylindrical member 3 has a bonding portion 5, an inner peripheral surface 6, an outer peripheral surface 7, an end face 4, and an end face 8. At the bonding portion 5, the end face 10 and the end face 20 face each other. The cylindrical member 3 is located between the end face 4 and the end face 8. It is assumed that, in the orthogonal coordinate system (x,y,z), a direction along the central axis of the cylindrical member 3 (axial direction) is defined as z direction and directions orthogonal to the z direction are defined as x direction and y direction. Hereinafter, the z direction is referred to as axial direction z. The end face 4 and the end face 8 are arranged in the axial direction z of the cylindrical member 3. Here, a state where two objects are arranged in one direction means that a straight line connecting the two objects extends along the one direction. Two objects arranged in one direction may be adjacent to each other or may be away from each other. The end face 4 and the end face 8 arranged in the axial direction z are away from each other.

At the bonding portion 5, the end face 10 and the end face 20 extend from the inner peripheral surface 6 to the outer peripheral surface 7.

The bonding portion 5 is produced by bending the metal plate 1 into a cylindrical shape and bringing the end faces 10, 20 into contact or bonding the end faces 10, 20. The bonding portion 5 can have no gap.

In brief, forming the metal plate 1 into a cylindrical shape is rolling the metal plate 1. The end face 20 in the metal plate 1 extends along the end face 10. At least part of the end face 10 of the metal plate 1 and at least part of the end face 20 of the metal plate 1 make up the bonding portion 5 of the cylindrical member 3. Here, if a cylindrical member that can be formed by rolling the metal plate 1 is not cut, the entire end face 10 of the metal plate 1 can be the bonding portion 5 of the cylindrical member 3, and the entire end face 20 of the metal plate 1 can be the bonding portion 5 of the cylindrical member 3. If a cylindrical member that can be formed by rolling the metal plate 1 is cut, part of the end face 10 of the metal plate 1 can be the bonding portion 5 of the cylindrical member 3, and part of the end face 20 of the metal plate 1 can be the bonding portion 5 of the cylindrical member 3.

The metal plate 1 has a back surface 16, a surface 17 along the back surface 16, an end face 14, and an end face 18 along the end face 14, in addition to the end faces 10, 20. At least part of the back surface 16 of the metal plate 1 becomes the inner peripheral surface 6 of the cylindrical member 3, and at least part of the surface 17 of the metal plate 1 becomes the outer peripheral surface 7 of the cylindrical member 3. Here, if a cylindrical member that can be formed by rolling the metal plate 1 is not cut, the entire back surface 16 of the metal plate 1 can be the inner peripheral surface 6 of the cylindrical member 3, and the entire surface 17 of the metal plate 1 can be the outer peripheral surface 7 of the cylindrical member 3. If a cylindrical member that can be formed by rolling the metal plate 1 is not cut, the end face 14 of the metal plate 1 becomes the end face 4 of the cylindrical member 3, and the end face 18 of the metal plate 1 becomes the end face 8 of the cylindrical member 3. Here, if a cylindrical member that can be formed by rolling the metal plate 1 is cut, part of the back surface 16 of the metal plate 1 can be the inner peripheral surface 6 of the cylindrical member 3, and part of the surface 17 of the metal plate 1 can be the outer peripheral surface 7 of the cylindrical member 3. If a cylindrical member that can be formed by rolling the metal plate 1 is cut, at least one of the end face 4 and the end face 8 of the cylindrical member 3 do not match the end face 14 and the end face 18 of the metal plate 1.

The cylindrical member 3 has, for example, a metal containing part containing metal. The metal contained in the metal containing part of the cylindrical member 3 includes any one of, for example, iron, copper, magnesium, and aluminum. The metal containing part of the cylindrical member 3 may be an alloy and can be, for example, iron alloy, copper alloy, magnesium alloy, or aluminum alloy.

Figure 1B:
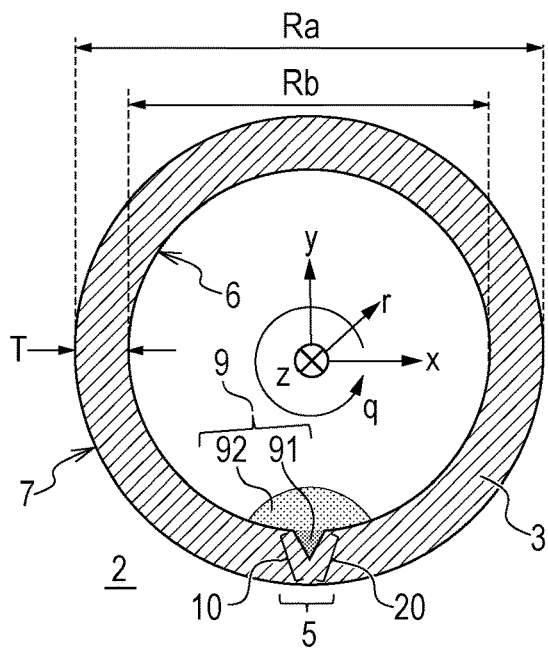
Figure 1C:
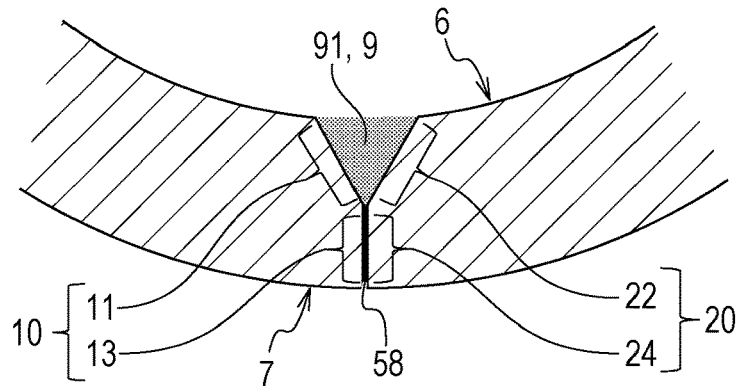

FIG. 1A shows the length L of the cylindrical member 3 in the z direction (axial direction z). The length L is a distance between the end face 4 and the end face 8. FIG. 1B is the sectional view of the cylindrical body 2, taken along a plane perpendicular to the z direction (axial direction z). FIG. 1C is an enlarged view of an area near the bonding portion 5.

In a cylindrical coordinate system (r,q,z), a radial direction r, a circumferential direction q, and an axial direction z of the cylindrical member 3 are defined. The thickness T of the cylindrical member 3 is a half of the difference between the outside diameter Ra and the inside diameter Rb of the cylindrical member 3 (T=(Ra−Rb)/2).

The present embodiment is suitable when the length L of the cylindrical member 3 in the axial direction z (the distance between the end face 4 and the end face 8) is greater than the outside diameter Ra of the cylindrical member 3 (L>Ra). According to the present embodiment, in the long narrow cylindrical member 3 that satisfies L>Ra, it is advantageous in improving the torsional rigidity around a central axis. However, it is also applicable when the length L of the cylindrical member 3 in the axial direction z is equal to the outside diameter Ra of the cylindrical member 3 (L=Ra) or less than the outside diameter Ra of the cylindrical member 3 (L<Ra).

The cylindrical body 2 includes a nonmetallic adhesive member 9 that bonds the end face 10 to the end face 20. Examples of the nonmetallic adhesive member 9 include resin adhesives, such as acrylic adhesives, epoxy adhesives, urethane adhesives, and silicone adhesives, and inorganic adhesives (ceramic adhesives), such as alumina adhesives, silica adhesives, and zirconia adhesives.

The adhesive member 9 can be in contact with the metal containing part of the cylindrical member 3. A metal that can be contained in the metal containing part of the cylindrical member 3 with which the adhesive member 9 contacts can be any one of iron, copper, magnesium, and aluminum as described above. Alternatively, the adhesive member 9 can be in contact with a metal chemical compound film covering the metal containing part. A metallic element that constitutes a metal chemical compound film with which the adhesive member 9 is in contact can be the same as the metal contained in the metal containing part. In other words, the metal chemical compound film with which the adhesive member 9 can contact can be a chemical compound film of metal contained in the metal containing part of the cylindrical member 3 and can be, for example, an iron chemical compound film, a copper chemical compound film, a magnesium chemical compound film, or an aluminum chemical compound film. The metal chemical compound film with which the adhesive member 9 can contact can be an oxide film, a nitride film, or a carbide film. The metal chemical compound film with which the adhesive member 9 can be in contact is typically a metal oxide film (natural oxide film) formed by natural oxidation of the metal contained in the metal containing part (natural oxidation film). To improve the abrasion resistance and corrosion resistance of the cylindrical body 2, a metal chemical compound film can be formed by applying oxidation (for example, anodizing), nitridation, carburization, or the like.

The adhesive member 9 can include an intermediate part 91 located between the end face 10 and the end face 20 and a non-intermediate part 92 not located between the end face 10 and the end face 20. The adhesive member 9 does not need to include the non-intermediate part 92. In other words, the adhesive member 9 may be present only between the end face 10 and the end face 20. For example, after the adhesive member 9 having the intermediate part 91 and the non-intermediate part 92 is formed, the non-intermediate part 92 is able to be removed. The non-intermediate part 92 bonds all or part of at least one of the inner peripheral surface 6 and the outer peripheral surface 7. Typically, the non-intermediate part 92 is bonded to part of any one of the inner peripheral surface 6 and the outer peripheral surface 7.

The intermediate part 91 of the adhesive member 9 is provided between an adhesive part 11 of the end face 10 and an adhesive part 22 of the end face 20. The adhesive part 11 and the adhesive part 22 can be at an angle to each other (i.e. not parallel to each other). When the adhesive part 11 and the adhesive part 22 are not parallel at the bonding portion 5, the bonding strength of the bonding portion 5 increases.

The nonparallel adhesive part 11 and adhesive part 22 face each other, and a taper groove, in which the adhesive part 11 and the adhesive part 22 serve as side walls, is formed. The intermediate part 91 of the adhesive member 9 is provided at the taper groove.

The two or more adhesive members 9 are able to be formed in the axial direction z of the cylindrical member 3. The range of application of adhesive that becomes the adhesive member 9 desirably includes the inside of the taper groove and part of the inner peripheral surface 6 contiguous to the taper groove and is desirably a range of an angle of ±90° from the bonding portion 5. A sufficient torsional strength is obtained by application of adhesive to the range of the angle of aperture ±90°. Application of adhesive in the range exceeding the above range increases the usage of adhesive, with the result that cost tends to increase.

The contact part 13 of the end face 10 is in contact with the contact part 24 of the end face 20. The contact part 13 is a part of the end face 10, which contacts with the end face 20. The contact part 24 is a part of the end face 20, which contacts with the end face 10. The bonding strength of the bonding portion 5 is increased by providing a contact area 58 in which the contact part 13 and the contact part 24 are in contact with each other at the bonding portion 5.

Both providing the adhesive member 9 and providing the contact area 58 are advantageous in increasing the bonding strength. With a combination of the adhesive member 9 and the contact area 58, a change in distance between the adhesive part 11 and the adhesive part 22 is suppressed by the contact area 58. Therefore, the deterioration of the adhesive member 9 itself and a decrease in adhesion at the adhesion interface due to a change in distance between the adhesive part 11 and the adhesive part 22 are suppressed, so the synergistic effect that the bonding strength of the bonding portion 5 increases is obtained.

Figure 2A:
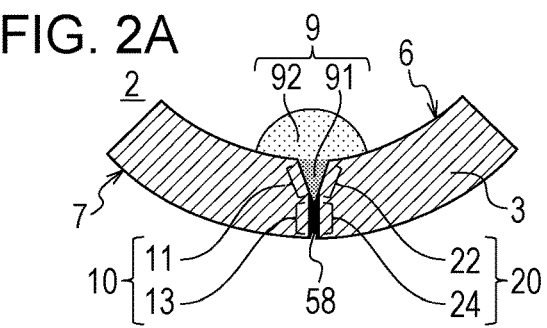
FIGS. 2A to 2J are schematic diagrams illustrating the cylindrical body.
Figure 2B:
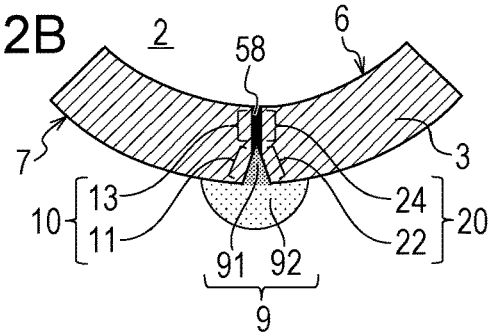
Figure 2C:
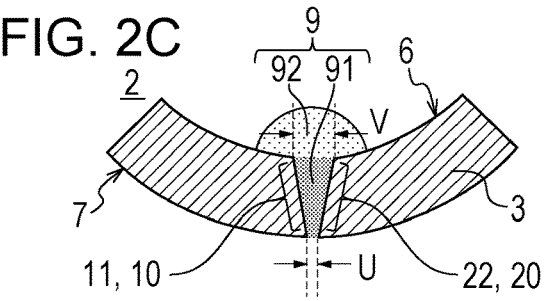
Figure 2D:
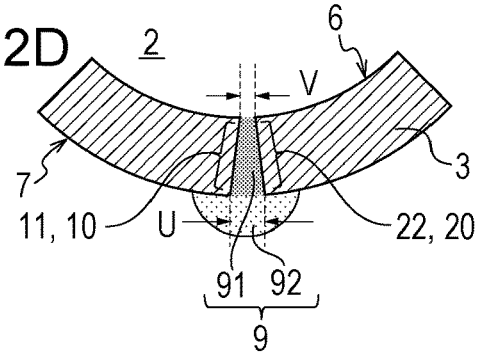
Figure 2E:
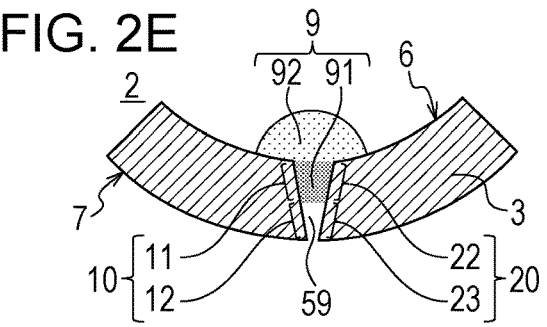
Figure 2F:
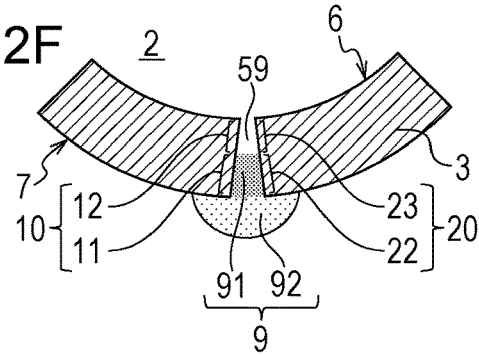
Figure 2G:
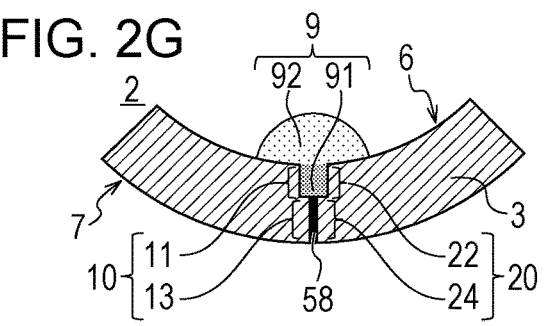
Figure 2H:
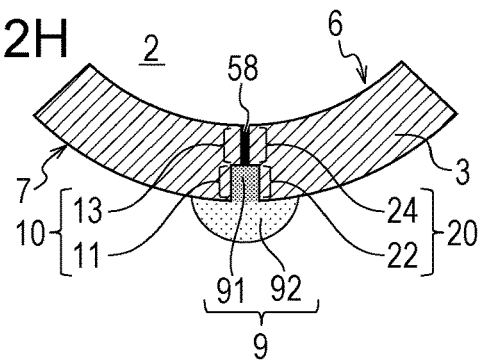
Figure 2I:
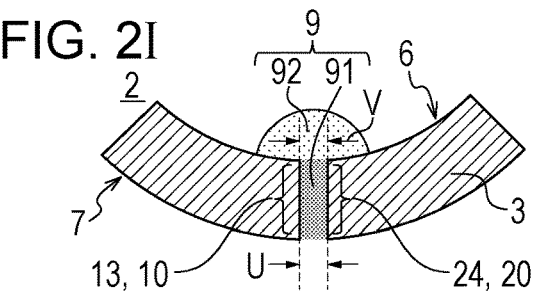
Figure 2J:
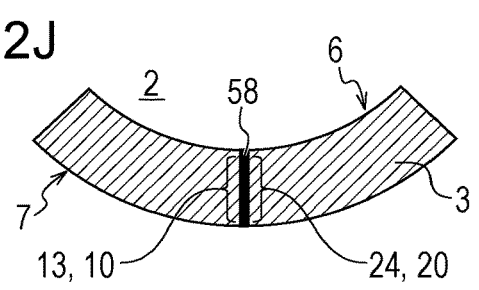

FIGS. 2A to 2J show some examples of the form of the bonding portion 5. FIG. 2A shows a first example. FIG. 2B shows a second example. FIG. 2C shows a third example. FIG. 2D shows a fourth example. FIG. 2E shows a fifth example. FIG. 2F shows a sixth example. FIG. 2G shows a seventh example. FIG. 2H shows an eighth example. FIG. 2I shows a ninth example. FIG. 2J shows a tenth example.

In the first to sixth examples, as shown by FIGS. 2A to 2F, the adhesive part 11 and the adhesive part 22 are not parallel to each other. In the seventh to ninth examples, the adhesive part 11 and the adhesive part 22 are parallel to each other. In the first, third, and fifth examples, the distance between the adhesive part 11 and the adhesive part 22 in the circumferential direction q reduces as a point shifts from the inner peripheral surface 6 toward the outer peripheral surface 7. In the second, fourth, and sixth examples, the distance between the adhesive part 11 and the adhesive part 22 in the circumferential direction q increases as a point shifts from the inner peripheral surface 6 toward the outer peripheral surface 7.

FIGS. 2C, 2D, and 2I show the distance V from the boundary between the end face 10 and the inner peripheral surface 6 of the cylindrical member 3 to the boundary between the end face 20 and the inner peripheral surface 6 of the cylindrical member 3. FIGS. 2C, 2D, and 2I also show the distance U from the boundary between the end face 10 and the outer peripheral surface 7 of the cylindrical member 3 to the boundary between the end face 20 and the outer peripheral surface 7 of the cylindrical member 3. In the third and fifth examples, the distance V is longer than the distance U (V>U). In the fourth and sixth examples, the distance V is shorter than the distance U (V<U). In the ninth example, the distance V is equal to the distance U (V=U) and the distance V and the distance U are greater than zero (V=U>0). In consideration of the viewability of the drawings, the signs of the distance V and the distance U are not shown in FIGS. 2A, 2B, 2E, 2F, 2G, 2H, and 2J; however, the distance V and the distance U are able to be similarly defined also in the first, second, fifth, sixth, seventh, eighth, and tenth examples. In the first and seventh examples, the distance V is longer than the distance U (V>U) and the distance U is zero (U=0). In the second and eighth examples, the distance V is shorter than the distance U (V<U) and the distance V is zero (V=0). In the tenth example, the distance V is equal to the distance U (V=U) and the distance V and the distance U are zero (V=U=0).

In the first, second, seventh, and eighth examples, the contact part 13 and the contact part 24 are in contact with each other at the bonding portion 5. In the first and seventh examples, the contact area 58 between the contact part 13 and the contact part 24 is located between the adhesive member 9 (intermediate part 91) and the outer peripheral surface 7. In the second and eighth examples, the contact area 58 between the contact part 13 and the contact part 24 is located between the adhesive member 9 (intermediate part 91) and the inner peripheral surface 6. In the tenth example, in the radial direction r, neither the adhesive member 9 nor an air gap 59 is provided between the end face 10 and the end face 20, and the contact area 58 between the end face 10 and the end face 20 is provided from the inner peripheral surface 6 to the outer peripheral surface 7.

In the first, third, fifth, and seventh examples, the non-intermediate part 92 of the adhesive member 9 is bonded to the inner peripheral surface 6. In the second, fourth, sixth, and eighth examples, the non-intermediate part 92 of the adhesive member 9 is bonded to the outer peripheral surface 7.

In the third, fourth, fifth, and sixth examples, the end face 10 and the end face 20 are not in contact, and the bonding portion 5 does not include the contact parts 13, 24. In the third and fourth examples, the entire end face 10 can be the adhesive part 11, and the entire end face 20 can be the adhesive part 22.

In the fifth and sixth examples, the air gap 59 is provided between the end face 10 and the end face 20. The air gap 59 is provided between a non-bonding part 12 of the end face 10 and a non-bonding part 23 of the end face 20. The non-bonding part 12 is not in contact with the end face 20, not bonded to the adhesive member 9, and can be exposed to the air gap 59. The non-bonding part 23 is not in contact with the end face 10, not bonded to the adhesive member 9, and can be exposed to the air gap 59. In the fifth example, the air gap 59 is located between the adhesive member 9 (intermediate part 91) and the outer peripheral surface 7. In the sixth example, the air gap 59 is located between the adhesive member 9 (intermediate part 91) and the inner peripheral surface 6.

In the first, second, seventh, and eighth examples, the adhesive member 9 and the contact area 58 are arranged in the radial direction r of the cylindrical member 3. In the fifth and sixth examples, the adhesive member 9 and the air gap 59 are arranged in the radial direction r of the cylindrical member 3. Other than the above, the adhesive member 9, the air gap 59, and the contact area 58 are arranged may be arranged in the radial direction r of the cylindrical member 3. For example, the air gap 59 may be provided between the adhesive member 9 and the contact area 58 in the radial direction r. Alternatively, the adhesive member 9 may be provided between the air gap 59 and the contact area 58 in the radial direction r, or the contact area 58 may be provided between the air gap 59 and the adhesive member 9 in the radial direction r.

In another mode, the adhesive member 9 and the contact area 58 in which the end face 10 and the end face 20 are in contact with each other may be arranged in the axial direction z of the cylindrical member 3. The adhesive member 9 and the air gap 59 may be arranged in the axial direction z of the cylindrical member 3. For example, the bonding portion 5 including the adhesive member 9, which is any one of the third, fourth, and ninth examples, and the bonding portion 5 including the contact area 58, which is the tenth example, may be arranged in the axial direction z of the cylindrical member 3. The adhesive member 9, the air gap 59, and the contact area 58 may be arranged in the axial direction z of the cylindrical member 3. For example, the air gap 59 may be provided between the adhesive member 9 and the contact area 58 in the axial direction z. Alternatively, the adhesive member 9 may be provided between the air gap 59 and the contact area 58 in the axial direction z, or the contact area 58 may be provided between the air gap 59 and the adhesive member 9 in the axial direction z.

When the adhesive member 9 is not used such that the bonding portion 5 is made up of only the form of the tenth example, torsional rigidity decreases. When the adhesive parts 11, 22 are parallel to each other all over the bonding portion 5 as in the case of the configuration that the bonding portion 5 is made up of only the form of the tenth example, the bonding area with the adhesive reduces, with the result that torsional rigidity becomes insufficient. When the area of the contact area 58 is extremely small, torsional rigidity decreases. When the metal plate 1 is bent to form a cylindrical member, the perimeter of the outer peripheral surface 7 becomes insufficient, and a gap occurs on the outer peripheral surface 7 side in the bonding portion 5. When adhesive is applied to the gap on the outer peripheral surface 7 side, the adhesive overflows from the gap to produce a step on the outer peripheral surface 7, which may influence the accuracy of outside diameter and roundness. If the outer peripheral surface is subjected to finish grinding to increase the accuracy of the outside diameter and roundness, the adhesive applied to the gap on the outer peripheral surface is removed by grinding, and necessary torsional strength may not be obtained. Thus, among the examples shown in FIGS. 2A to 2J, the first example (FIG. 2A) is suitable for components that need high accuracy.

Figure 3A:
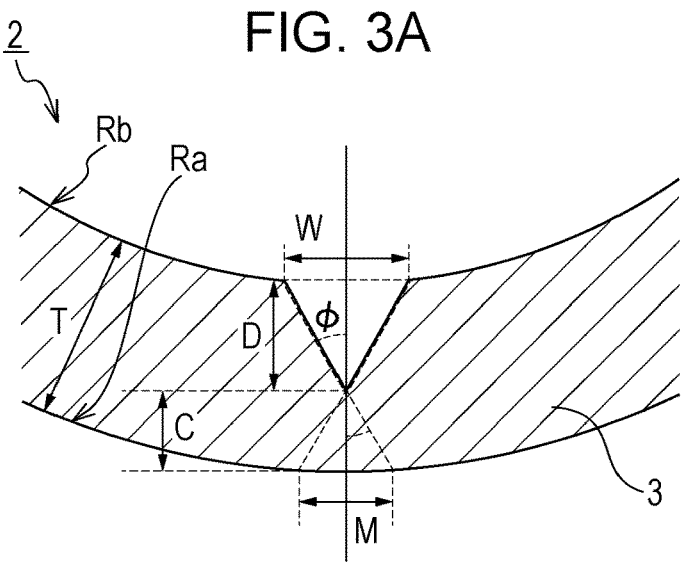
FIGS. 3A to 3D are schematic diagrams illustrating the cylindrical body.

The dimensions of each of the parts near the bonding portion 5 will be described with reference to FIG. 3A. FIG. 3A shows the length C of the contact area 58 between the contact part 13 and the contact part 24 in the radial direction r.

In addition, FIG. 3A shows the length D of the adhesive member 9 in the radial direction r between the end face 10 and the end face 20. The adhesive member 9 between the end face 10 and the end face 20 means the intermediate part 91 of the adhesive member 9. The length D is the length of the intermediate part 91 in the radial direction r. The sum of the length C and the length D is equal to the thickness T (C+D=T) or less than the thickness T (C+D<T). When the air gap 59 (see FIGS. 2E and 2F) is provided in the bonding portion 5, the sum of the length C and the length D is less than the thickness T (C+D<T). When the length E of the air gap 59 in the radial direction r is used, the sum of the length C, the length D, and the length E can be equal to the thickness T (C+D+E=T).

The contact area 58 between the contact part 13 and the contact part 24 is able to suppress a deviation between the end face 10 and the end face 20, so the area of the contact area 58 between the contact part 13 and the contact part 24 can be increased as much as possible. The intermediate part 91 is able to suppress a deviation between the end face 10 and the end face 20, so the volume of the intermediate part 91 can be increased as much as possible. By making the adhesive part 11 and the adhesive part 22 not parallel to each other, the volume of the intermediate part 91 is able to be increased.

The length C of the contact area 58 is preferably greater than or equal to 10% of the thickness T (C≥0.1×T), preferably less than or equal to 90% of the thickness T (C≤0.9×T), and preferably greater than or equal to 50% of the thickness T (C≥0.5×T). When the length C of the contact area 58 is extremely large (for example, C>0.9×T), the length D is extremely small, so the bonding effect of the intermediate part 91 reduces. When the length C of the contact area 58 is extremely small (for example, C<0.1×T), the taper groove is deep, so adhesive that will be the adhesive member 9 may be not supplied to near the contact area 58. As a result, the air gap 59 is formed between the adhesive member 9 and the contact area 58. The presence of the air gap 59 may be not advantageous in improvement of strength. In consideration of these points, C≥0.5×T is preferably satisfied. The length D of the intermediate part 91 is preferably greater than or equal to 10% of the thickness T (D≥0.1×T), preferably less than or equal to 90% of the thickness T (D≤0.9×T), and preferably less than or equal to 50% of the thickness T (D≤0.5×T). When the length D of the intermediate part 91 is extremely small (for example, D<0.1×T), the bonding effect of the intermediate part 91 reduces.

The length C of the contact area 58 may be less than the length D of the intermediate part 91 (C<D) or may be equal to the length D of the intermediate part 91 (C=D). However, the length D of the contact area 58 is preferably greater than the length D of the intermediate part 91 (C>D). For example, the length C of the contact area 58 is preferably greater than or equal to twice the length D of the intermediate part 91 (C≥2×D). When the length C is extremely increased, the length D of the intermediate part 91 is extremely small, so the effect of providing the adhesive member 9 reduces. Therefore, the length C of the contact area 58 is preferably less than or equal to four times the length D of the intermediate part 91 (C≤4×D). To satisfy C≥2×D or C≤4×D on the assumption that C+D=T, the length D of the intermediate part 91 is preferably greater than or equal to ⅓ of the thickness T (D≥T/3) and preferably less than or equal to ⅕ of the thickness T (D≤T/5).

FIG. 3A shows the width W of the adhesive member 9 in the circumferential direction q of the cylindrical member 3 between the end face 10 and the end face 20. The adhesive member 9 between the end face 10 and the end face 20 means the intermediate part 91 of the adhesive member 9. The width W means the length of the intermediate part 91 in the circumferential direction q. The length C of the contact area 58 may be less than the width W of the intermediate part 91 (C<W) or may be equal to the width W of the intermediate part 91 (C=W). However, to increase the adhesion strength of the adhesive member 9, the length C of the intermediate part 91 is preferably greater than the width W of the intermediate part 91 (C>W). For example, the length C of the contact area 58 is preferably greater than or equal to three times the width W of the intermediate part 91 (C≥3×W). When the length C is extremely increased, the effect of providing the adhesive member 9 reduces. Therefore, the length C of the contact area 58 is preferably less than or equal to nine times the width W of the intermediate part 91 (C≤9×W) and more preferably less than or equal to six times the width W of the intermediate part 91 (C≤6×W).

The width W of the intermediate part 91 may be greater than the length D of the intermediate part 91 (W>D) or may be equal to the length D of the intermediate part 91 (W=D). However, the width W of the intermediate part 91 is preferably less than the length D of the intermediate part 91 (D>W). This is because the adhesion strength of the adhesive member 9 increases as the width W of the intermediate part 91 reduces and can increase as the length D of the intermediate part 91 increases.

The difference between the inside diameter Rb and the outside diameter Ra of the cylindrical member 3 can be, for example, greater than or equal to 1 mm and less than or equal to 4 mm. In other words, the thickness T can be, for example, greater than or equal to 0.5 mm and less than or equal to 2 mm. The length C of the contact area can be, for example, greater than or equal to 0.5 mm and less than or equal to 1.5 mm. The length D of the adhesive member 9 can be, for example, greater than or equal to 0.1 mm and less than or equal to 0.5 mm. The width W of the adhesive member 9 can be, for example, greater than or equal to 0.1 mm and less than or equal to 0.5 mm.

Figure 3B:
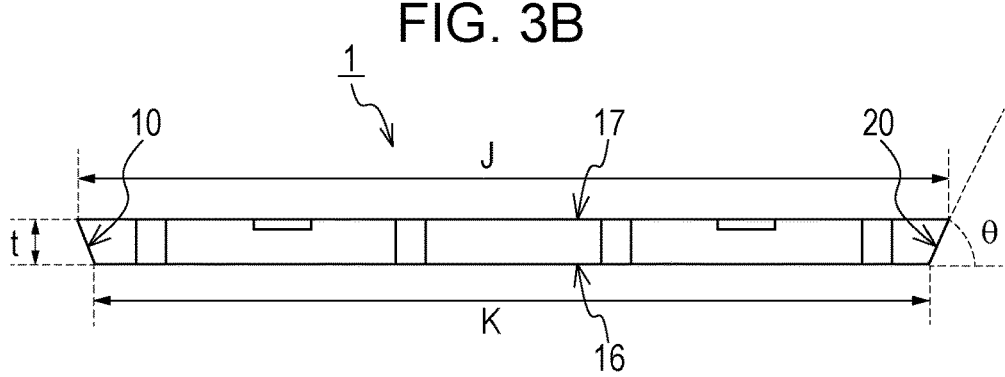
Figure 3C:
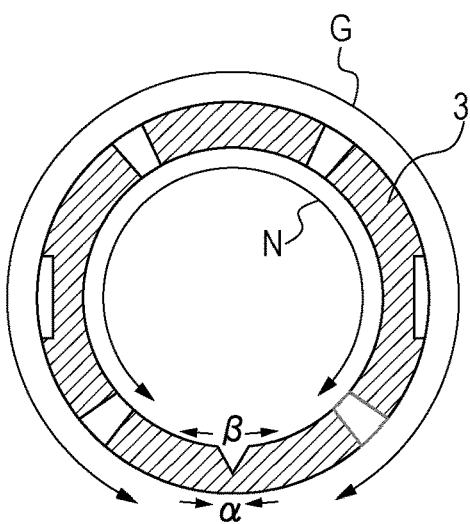
Figure 3D:
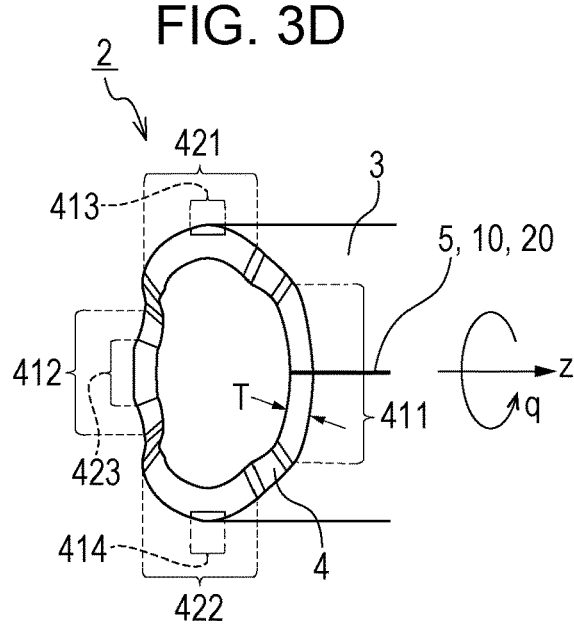

As shown in FIG. 3D and FIGS. 4A to 4D, at least one of the end face 4 and the end face 8 of the cylindrical member 3 may have protrusions and recesses. FIG. 3D is an enlarged view of an example of the end face 4. On the end face 4, a recess 411, a protrusion 421, a recess 412, and a protrusion 422 are arranged in this order in the circumferential direction q. A step is provided between each of the recesses 411, 412 and each of the protrusions 421, 422.

The bonding portion 5 is provided at the recess 411. A recess 413 smaller in width in the circumferential direction q and smaller in width in the radial direction r than the protrusion 421 is provided in the protrusion 421. A protrusion 423 smaller in width in the circumferential direction q than the recess 412 is provided in the recess 412. A recess 414 smaller in width in the circumferential direction q and smaller in width in the radial direction r than the protrusion 422 is provided in the protrusion 422. The width of each of the recesses 411, 412 and the protrusions 421, 422 in the circumferential direction r at each of the end faces 4, 8 is typically greater than the thickness T of the cylindrical member 3.

The recesses 413, 414 are provided at two locations in the circumferential direction q at the end face 4 of the cylindrical member 3. The location of each of the recesses 413, 414 is desirably within the range of the angle of aperture of 80° to 100° from the bonding portion 5. The depth of each of the recesses 413, 414 needs to be less than or equal to 50% of the wall thickness of the cylindrical member 3 made of metal. This is because, when the depth of each of the recesses 413, 414 is greater than or equal to 50% of the wall thickness, the strength of the material of each of the recesses 413, 414 can decrease.

In bending the metal plate 1 into a cylinder to provide the cylindrical member 3, each of the recesses 413, 414 is provided at a protruding portion of the metal plate in the longitudinal direction, so the effect of preventing the ends of the cylindrical member 3, which tend to increase in outside diameter, from being caught in a die is obtained.

The location of the adhesive member 9 will be described with reference to FIGS. 4A to 4E. In an eleventh example of FIG. 4A, the adhesive member 9 is disposed so as to extend from the end face 4 to the end face 8 along the bonding portion 5 between the end face 10 and the end face 20. In other words, the distance between the adhesive member 9 and the end face 4 and the distance between the adhesive member 9 and the end face 8 are zero. In a twelfth example of FIG. 4B, the adhesive member 9 is disposed away from the end face 4 and the end face 8. In a thirteenth example of FIG. 4C, the adhesive member 9 is disposed separately as an adhesive member 9a and an adhesive member 9b. The adhesive member 9a is disposed away from the end face 4 and the end face 8. The adhesive member 9b is disposed away from the end face 4 and the end face 8. The adhesive member 9b is disposed away from the adhesive member 9a. In other words, the adhesive member 9a and the adhesive member 9b are not continuous. The adhesive member 9a and the adhesive member 9b both have the feature of the above-described adhesive member 9. In other words, the adhesive member 9a bonds an adhesive part close to the end face 4 in the end face 10 of the cylindrical member 3 with an adhesive part close to the end face 4 in the end face 20 of the cylindrical member 3. In addition, the adhesive member 9b bonds an adhesive part close to the end face 8 in the end face 10 of the cylindrical member 3 with an adhesive part close to the end face 8 in the end face 20 of the cylindrical member 3. A part of the end face 10, bonded by the adhesive member 9b, is disposed away from an adhesive part of the end face 10, bonded by the adhesive member 9a. A part of the end face 20, bonded by the adhesive member 9b, is disposed away from an adhesive part of the end face 20, bonded by the adhesive member 9a. In a fourteenth example (not shown), the adhesive member 9a may be disposed so as to extend from the end face 4, the adhesive member 9b may be disposed so as to extend from the end face 8, and the adhesive member 9a and the adhesive member 9b may be not continuous.

The bonding portion 5 extends in the axial direction z of the cylindrical member 3, and, in the bonding portion 5, the end faces 10, 20 extending from the outer peripheral surface 7 of the cylindrical member 3 to the inner peripheral surface 6 are present all over the cylindrical member 3 in the axial direction z. A taper groove extending toward the inner peripheral surface 6 is present on the inner peripheral surface 6 of the bonding portion 5. The adhesive member 9 is present so as to bury all or part of the taper groove. The taper groove is present all over the cylindrical member 3 in the axial direction z, and the depth of the taper groove is desirably less than or equal to 50% of the thickness T of the cylindrical member 3. In other words, the length of the contact area 58 is preferably greater than or equal to 50% of the thickness T. In this way, by sufficiently increasing the length of the contact area 58, in applying finish grinding to the outer peripheral surface 7, it is possible to suppress a decrease in the torsional strength of the cylindrical member 3 and formation of a gap on the outer peripheral surface 7 side.

Figure 4A:
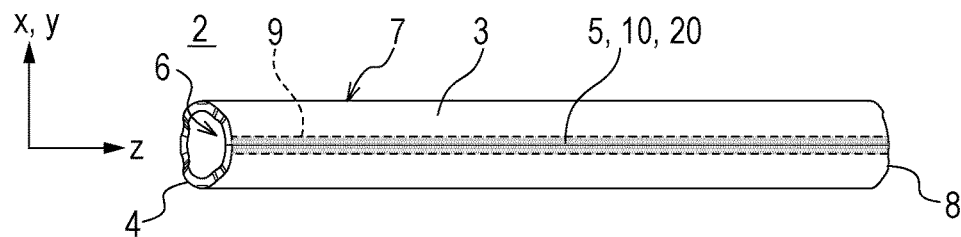
FIGS. 4A to 4E are schematic diagrams illustrating the cylindrical body.
Figure 4B:
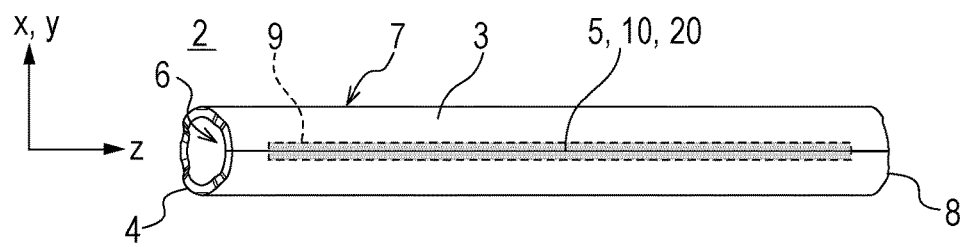
Figure 4C:
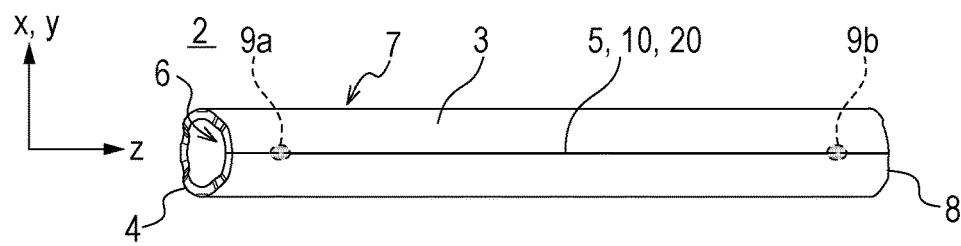
Figure 4D:
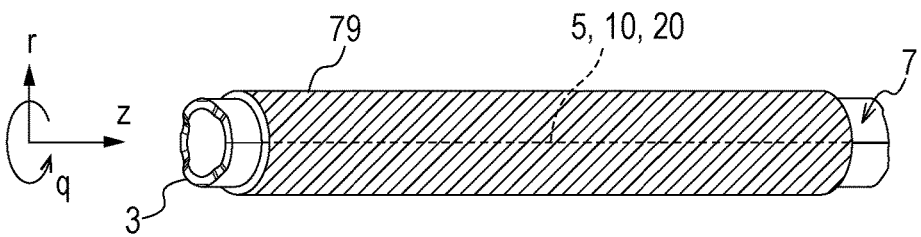
Figure 4E:
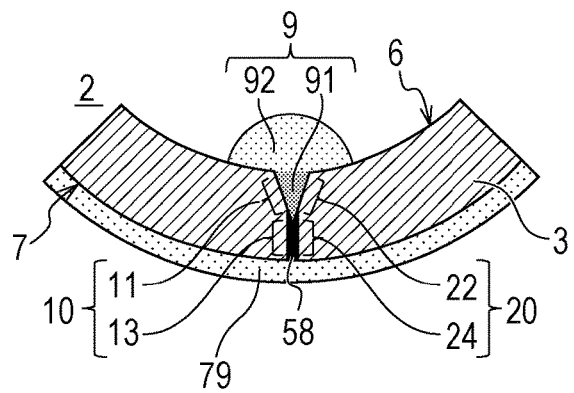

As shown in FIG. 4D, the cylindrical body 2 can include an additional member 79 covering the outer peripheral surface 7 of the cylindrical member 3. The additional member 79 can be made of metal or nonmetal. The metal additional member 79 can be, for example, a plating layer. The nonmetal additional member 79 can be made of resin, rubber, or ceramics. The additional member 79 may be a composite member in which metal or nonmetal particles (filler) are dispersed in a matrix resin (binder resin). Nonmetal particles can be a chemical compound, such as oxides and nitrides. The additional member 79 may overlap the adhesive member 9 in the radial direction r. In the sectional view shown in FIG. 4E, the end face 10 and the end face 20 are located between the adhesive member 9 and the additional member 79 in the radial direction r of the cylindrical member 3. Since the contact area 58 is provided between the adhesive member 9 and the additional member 79, interaction between the adhesive member 9 and the additional member 79 can be suppressed.

FIG. 3B is a side view of the metal plate 1. FIG. 3B shows the width J of the surface 17 that will be the outer peripheral surface 7, the width K of the back surface 16 that will be the inner peripheral surface 6, the thickness t of the metal plate 1, and the taper angle θ of each of the end faces 10, 20 in forming the metal plate 1 into a cylinder. The width J, the width K, the thickness t, and the taper angle θ can satisfy the expression (1).

$$K = J - \frac{2t}{\tan\theta} \quad (1)$$

FIG. 3C is a sectional view at the time when the metal plate 1 is formed into the cylindrical member 3. In bending the metal plate 1 into a cylinder, tensile stress occurs on the outer peripheral surface 7 side of the metal plate 1, and compressive stress occurs on the inner peripheral surface 6 side. The extended length of one side of a material on the outer peripheral surface 7 due to tensile stress is α, and contracted length of one side of a material on the inner peripheral surface 6 side due to compressive stress is β. The outer perimeter G and inner perimeter N of the cylindrical member 3 are respectively expressed by the expression (2) and the expression (3).

$$G = J + 2\alpha \quad (2)$$

$$N = K - 2\beta \quad (3)$$

From the expressions (1) and (3), the expression (4) is obtained.

$$N = J - \frac{2t}{\tan\theta} - 2\beta \quad (4)$$

In FIG. 3A, the maximum distance between the adhesive part 11 and the adhesive part 22 matches the width W of the intermediate part 91 of the adhesive member 9. The width W is the length, in the circumferential direction q, of the taper groove expanding on the inner peripheral surface side. The adhesive parts 11, 22 each are inclined with respect to the radial direction r. The distance between a location at which an imaginarily extended line of the adhesive part 11 intersects with the outer peripheral surface and a location at which an imaginarily extended line of the adhesive part 22 intersects with the outer peripheral surface is length M.

The relationship among the outside diameter Ra, the inside diameter Rb, the width W, and the length M of the cylindrical member 3 is expressed by the following expressions (5) and (6).

$$M \approx G - \pi R_a \quad (5)$$

$$W \approx \pi R_b - N \quad (6)$$

As shown in FIG. 3A, an angle ϕ formed by each of the adhesive parts 11, 12 with respect to the radial direction r is defined. The angle ϕ of each of the adhesive parts 11, 22 depends on a taper angle ϕ, and typically ϕ=90°−θ. The relationship among the width W, the length M, the length C, and the length D is expressed by the expressions (7) and (8) from a geometrical relationship. From the expressions (7) and (8), the expression (9) is obtained.

$$\tan\phi = \frac{W}{2D} \quad (7)$$

$$\tan\phi = \frac{M}{2C} \quad (8)$$

$$\frac{D}{C} = \frac{W}{M} \quad (9)$$

By substituting the expressions (5) and (6) into the expression (9), the expression (11) is obtained.

$$\frac{D}{C} = \frac{\pi R_b - N}{G - \pi R_a} \quad (11)$$

By substituting the expressions (2), (3), and (4) into the expression (11), the condition that satisfies D≤C is expressed by the expression (12). It should be noted that t=T.

$$\tan\theta \geq \frac{2T}{2J + 2\alpha - 2\beta - \pi(R_a + R_b)} \quad (12)$$

By substituting the expressions (2), (3), and (4) and C=T−D into the expression (11), the expression (13) is obtained.

$$D = \frac{(\pi R_b - J + 2\beta)\tan\theta + 2T}{2(\alpha + \beta - 2\pi T)\tan\theta + 2T} \quad (13)$$

From the expression (13), it is possible to determine a taper shape suitable for adhesion, specifically, the dimensions of a material before formation of a cylinder, needed to obtain the depth D and width W of a groove to which adhesive enters.

As an example using the expression, the dimensions of a material at the time of making a cylinder core shaft with T=1.2 mm and Ra=10 mm will be described. In the cylinder core shaft, to obtain appropriate torsional strength with an application of instant adhesive to a seam, it is known that D=0.3 mm is desirable from an adhesive impregnation test and a torsional test. From an experimental result, α=1.90 mm and β=1.85 mm were obtained. Thus, J=27.83 mm and θ=70° are derived, so it is possible to determine the dimensions of a material before formation of a cylinder. Typically, 60°≤θ≤80°, and 10°≤ϕ≤30°. An angle formed between the adhesive part 11 and the adhesive part 22 is 2ϕ, so the angle formed between the adhesive part 11 and the adhesive part 22 can be larger than or equal to 20° and less than or equal to 60°. By forming a cylinder core shaft in accordance with the obtained material dimensions and applying adhesive to the seam groove, a desired cylinder core shaft with a necessary torsional strength is obtained.

A manufacturing method for the cylindrical body 2 will be described. A substantially rectangular preform metal plate is bent, and end faces are brought into contact with each other. More specifically, a pair of end faces of a preform metal plate is adjusted to a taper shape.

The metal plate preform is held and closed by at least a pair of male die and female die to obtain a U-shaped metal plate (U-shape bending process). The U-shaped metal plate is held and closed by a pair of female dies having a cylindrical shape corresponding to the shape of the outer peripheral surface of a metal cylindrical member to form the outer peripheral surface into a cylindrical shape (O-shape bending process).

Adhesive is applied into a taper expanding toward the inner peripheral surface of the metal cylindrical member formed by O-shape bending (application process). Thus, a cylindrical body is obtained.

Figure 5A:
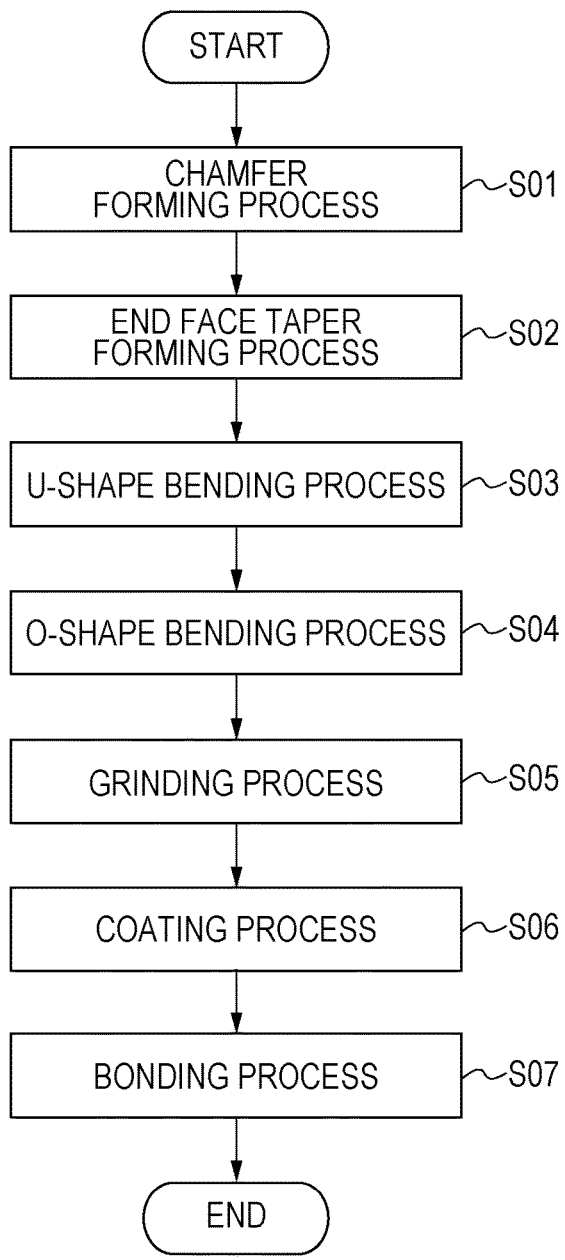
FIGS. 5A and 5B are process charts each illustrating a manufacturing method for a cylindrical body.

FIG. 5A is a process chart in a first manufacturing method. The description will be made in detail with reference to FIGS. 6A to 8I.

Figure 6A:
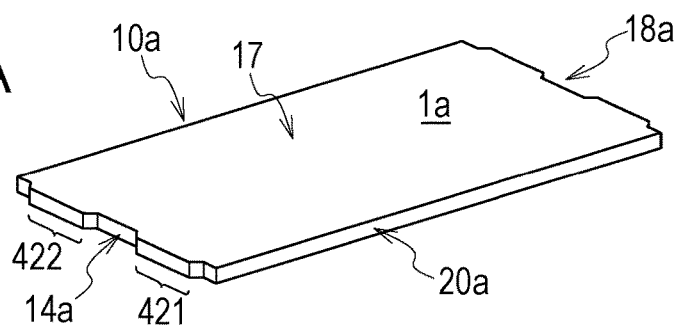
FIGS. 6A to 6D are schematic diagrams illustrating a manufacturing method for a cylindrical body.

In a chamfer forming process S01 of FIG. 5A, a chamfer is formed on a metal plate that is a raw material. FIG. 6A shows a preform metal plate 1a. The preform metal plate 1a is a thin metal plate having end faces 10a, 20a, end faces 14a, 18a, a surface 17, and a back surface 16. When the preform metal plate 1a is formed into the cylindrical member 3, the end faces 10a, 20a contact with each other to form the contact area 58 and extend in the axial direction z after a cylinder is formed. The end face 14a has protrusions 421, 422 via the recess. The same applies to the end face 18a. A material that is able to be deformed in cold bending with a predetermined strength, such as steel plate cold commercial (SPCC), stainless steel, and aluminum alloy, is applicable as the material of the preform metal plate 1a; however, the material is not limited thereto. The preform metal plate 1a is manufactured by press-cutting a continuous sheet material; however, the configuration is not limited thereto. The preform metal plate 1a may be manufactured by machining, such as wire discharge working.

Figure 6B:
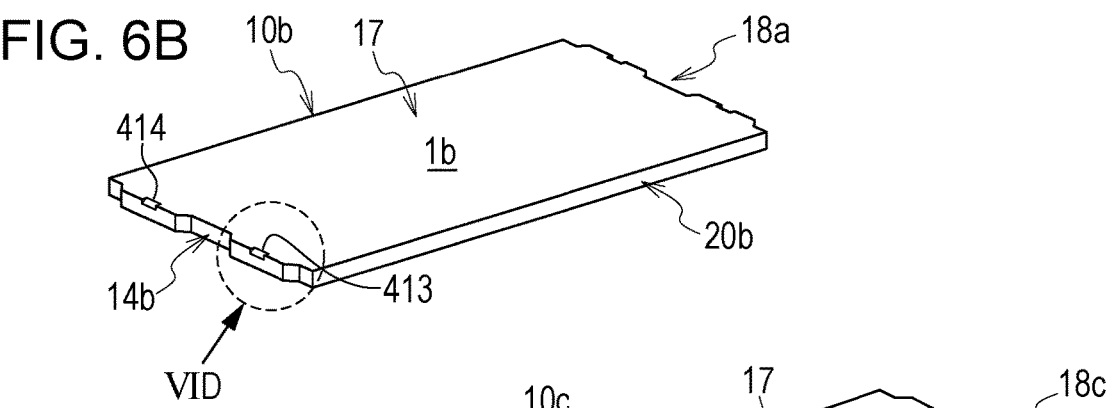
Figure 7A:
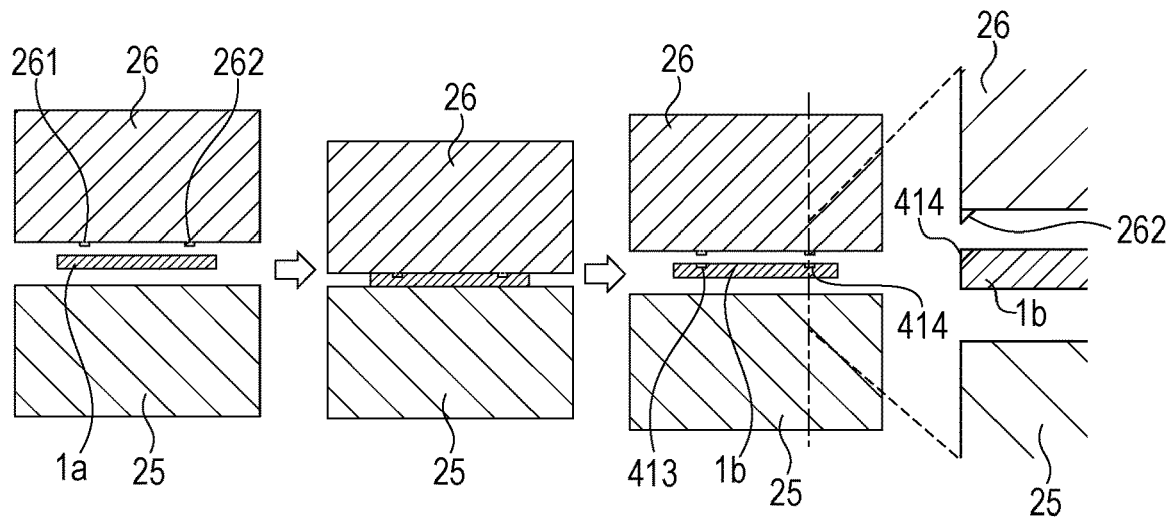
FIGS. 7A to 7C are schematic diagrams illustrating a manufacturing method for a cylindrical body.

FIG. 7A is an operation chart of dies and a molded product, showing the chamfer forming process S01. FIG. 7A shows a process of holding the preform metal plate 1a between a chamfer forming upper die 26 and a chamfer forming lower die 25 and closing the dies. In the chamfer forming upper die 26, projections 261, 262 are disposed so as to be located near the protrusions 421, 422 of the end faces 14a, 18a of the metal plate 1a on a molding face. The molding face of the chamfer forming lower die 25 is flat. The chamfer forming upper die 26 and the chamfer forming lower die 25 are made from a hardened steel or a hard metal, and the projection 261 has a top-pointed V-shape or a top-rounded U-shape. The dies are closed until the gap between the chamfer forming upper die 26 and the chamfer forming lower die 25 becomes a predetermined thickness, and then the taken-out preform metal plate 1b has recesses 414, 413. FIG. 6B is a view of the preform metal plate 1b, in which the recesses 414, 413 are respectively formed in the protrusions 422, 421 (see FIG. 6A) of the end face 14. The length of the end face 14b of the preform metal plate 1b in the width direction is desirably adjusted to 85% to 90% of the outer perimeter of the metal cylindrical member 3 in consideration of elongation of the material at the time of cylinder bending forming.

Figure 6C:
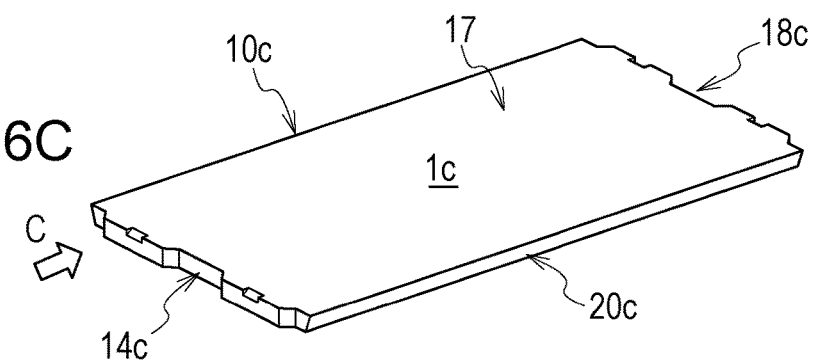
Figure 6D:
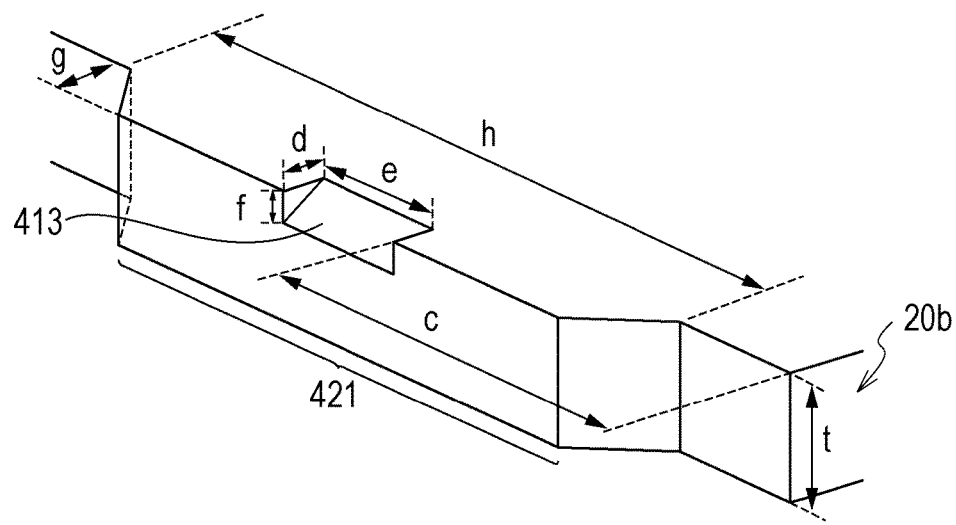

FIG. 6D is an enlarged view of portion VID in FIG. 6B. Each of the recesses 413, 414 has an inclined shape from a metal plate top face to a side end face. The distance of the recess 413 from the end face 20b is c, the distance from the end face is d, the width of the recess 413 is e, the depth of chamfer is f, the amount of protrusion of the protruding portion to the side end face is g, the width of the protruding portion is h, and the plate thickness is t.

The distance c from the end face 20b is preferably about a quarter of the length of the end face 14b of the preform metal plate 1b in the width direction. In other words, the distance c is desirably set such that the locations of the recesses 413, 414 in the metal cylindrical member 3 fall within the range of an angle of aperture of 80° to 100° from the bonding portion 5.

In addition, the distance d from the side end face is preferably less than or equal to the amount of protrusion g, the width e of chamfer is preferably less than or equal to a half of the protrusion width h, and the width f of chamfer is preferably less than or equal to a half of the plate thickness t. When chamfering is performed with the above dimensions or greater, internal stress is accumulated in a material more than necessary through chamfer forming, so it is difficult to bend and form a protruding portion. This leads to deterioration of roundness.

Subsequently, an end face taper forming process S02 in FIG. 5A will be described. In the end face taper forming process S02, before the metal plate is formed into a cylindrical shape, the metal plate is held such that the metal plate is deflected in a direction opposite to a direction to be bent with a pair of dies once, and the end faces of the metal plate are cut off in this state to thereby form a taper shape at each of the end face parts of the metal plate. A case of one process is described this time; however, the configuration is not limited thereto. A method of forming a taper by clamping end faces with a pair of dies can be used.

Figure 7B:
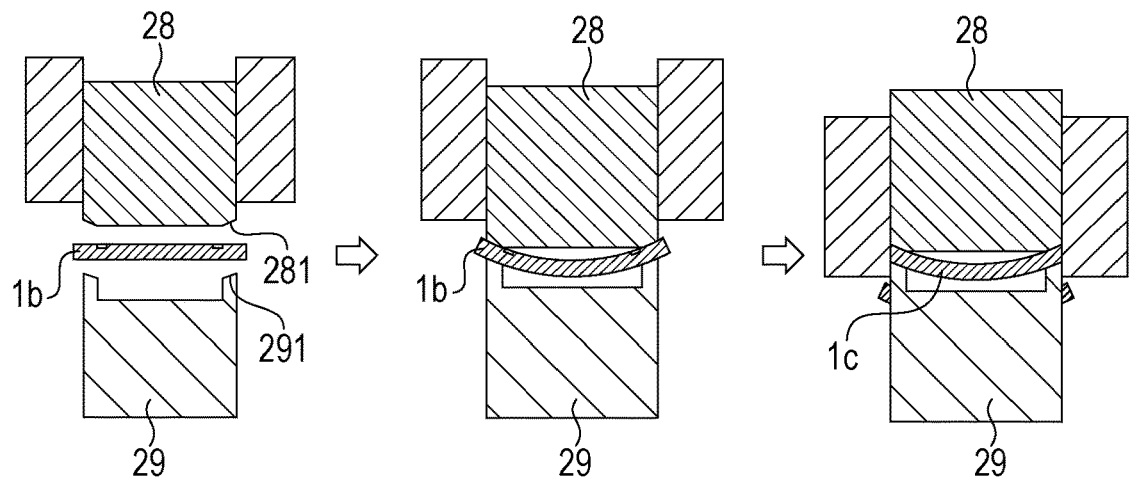

FIG. 7B is an operation chart of dies and a molded product, showing the end face taper forming process S02. FIG. 7B shows a process in which the chamfered preform metal plate 1b is held between a taper forming upper die 28 and a taper forming lower die 29 and the dies are closed, and the end faces are cut off in a state where the preform metal plate 1b is deflected in a direction opposite to the bending direction to thereby form a taper shape at each of the end faces of the preform metal plate 1b. The taper forming upper die 28 and the taper forming lower die 29 are made from hardened steel or hard metal, the taper forming upper and lower dies have tapers, and the dimensions of a taper groove on the inner peripheral surface of the metal cylindrical member 3 is adjusted by adjusting the angle of each of the tapers. The taken-out preform metal plate 1c has tapers.

Figure 9:
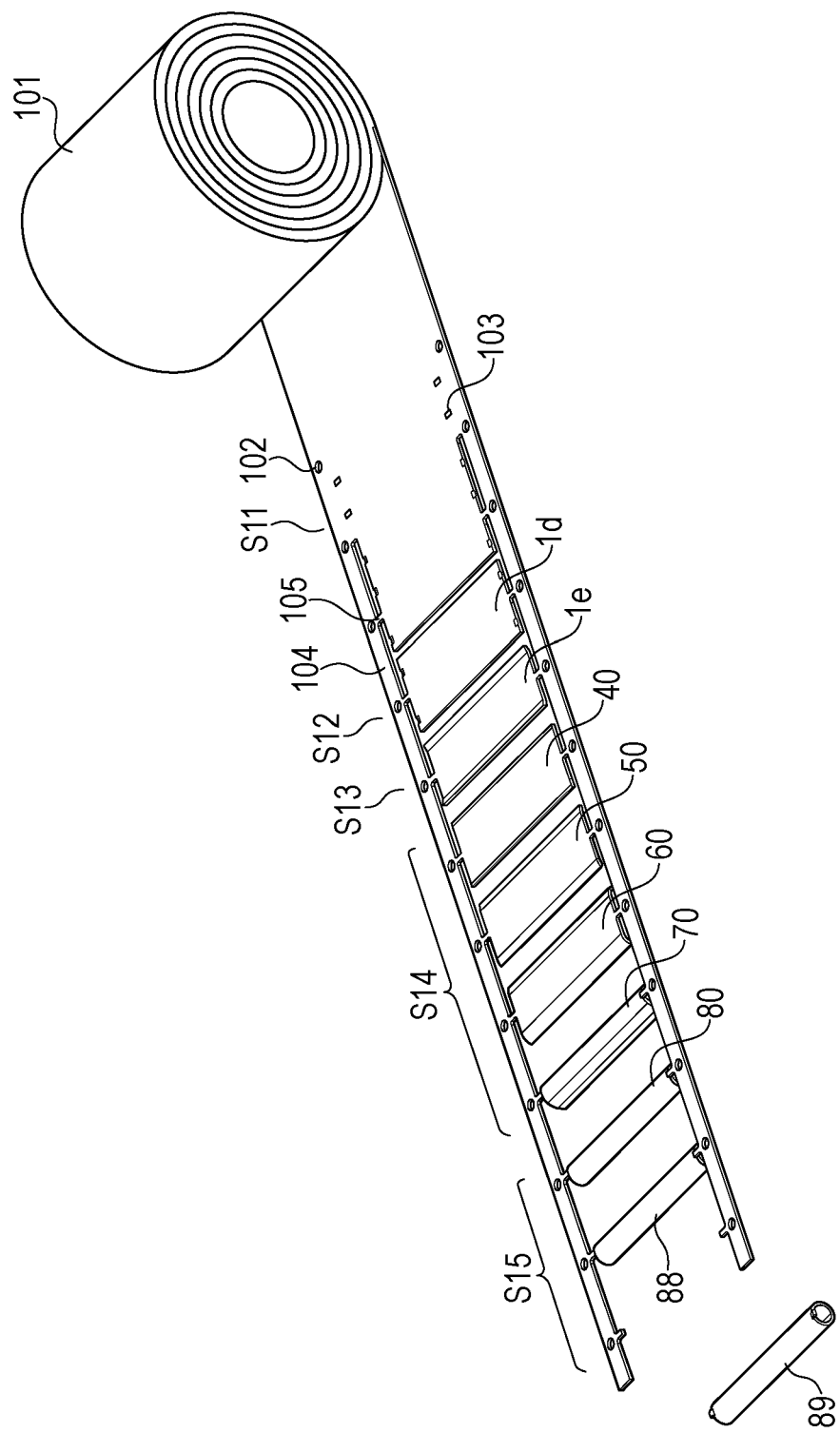
FIG. 9 is a schematic diagram illustrating a manufacturing method for a cylindrical body.

FIG. 6C is a view obtained by flattening the preform metal plate 1c of which the end faces are cut off in FIG. 9. The tapers are respectively formed at the end faces 10a, 20a.

The metal plate 1 having the feature of the preform metal plate 1c (tapered preform metal plate) prepared in this way is put into a molding process.

Next, a U-shape bending process S03 in FIG. 5A will be described. The U-shape bending process S03 is made up of a process of bending the ends of the flat plate held between the female die and the male die in a stepwise manner and a process of bending the center of the flat plate.

As for the number of processes, a case where the process of bending the ends includes three processes, that is, first to third U-shape bending processes, and a center bending process is one process, that is, a fourth U-shape bending process, will be described; however, the processes are not limited thereto. The number of processes can be varied according to a request.

FIGS. 8A to 8D are views showing the U-shape bending process S03 by using the sectional view of dies and a molded product, taken orthogonally to the axial direction of the intended metal cylindrical member 3. The end bending process is performed such that the width of bending increases in a stepwise manner from the ends of the metal plate 1. This is to make it easy to insert a material into a die in a subsequent O-shape bending process.

Figure 8A:
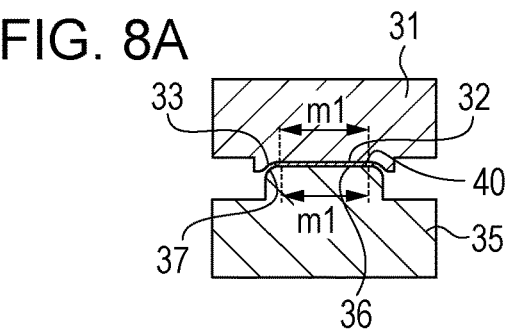
FIGS. 8A to 8I are schematic diagrams illustrating a manufacturing method for a cylindrical body.

FIG. 8A is a sectional view of dies and a molded product in the first U-shape bending process. This is a process of holding the metal plate 1 with a U-shape bending first upper die 31 and a U-shape bending first lower die 35 and pressuring the metal plate 1. The U-shape bending first upper die 31 has an axial groove. A first upper die groove flat part 32 extends at the center of the axial groove. A first upper die groove cylindrical surface part 33 extends at each end. The width of the first upper die groove flat part 32 is defined as m1. The value of m1 changes with the number of processes of the U-shape bending process. The radius of the first upper die groove cylindrical surface part 33 is defined as R1.

The U-shape bending first lower die 35 has an axial ridge. A first lower die ridge flat part 36 extends at the center of the axial ridge. A first lower die ridge cylindrical surface part 37 extends at each end. The width of the first lower die ridge flat part 36 is m1 equal to the width of the first upper die groove flat part 32. The radius of the first lower die ridge cylindrical surface part 37 is R1−t.

In the first U-shape bending process, the metal plate 1 held between the U-shape bending first upper die 31 and the U-shape bending first lower die 35 is bent from the ends, and a U-shape bending first intermediate molded product 40 is obtained. The radii of the cylindrical surface part formed at each end of the U-shape bending first intermediate molded product 40 taken out from the dies are defined as r1 and r1−t.

Figure 8B:
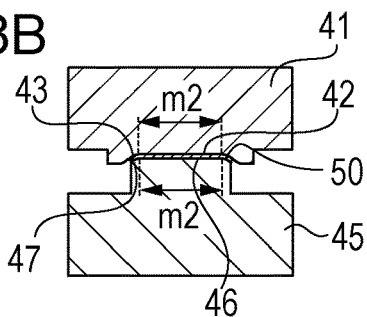

FIG. 8B shows a second U-shape bending process. The second U-shape bending process is a process in which dies for the U-shape bending first intermediate molded product 40 are replaced and the U-shape bending first intermediate molded product 40 is held between a U-shape bending second upper die 41 and a U-shape bending second lower die 45 and pressurized. The U-shape bending second upper die 41 has an axial groove. A second upper die groove flat part 42 extends at the center of the axial groove. A second upper die groove cylindrical surface part 43 extends at each end. The width of the second upper die groove flat part 42 is defined as m2. The value of m2 changes with the number of processes of the U-shape bending process. The radius of the second upper die groove cylindrical surface part 43 is defined as R2.

The U-shape bending second lower die 45 has an axial ridge. A second lower die ridge flat part 46 extends at the center of the axial ridge. A second lower die ridge cylindrical surface part 47 extends at each end. The width of the second lower die ridge flat part 46 is m2 equal to the width of the second upper die groove flat part 42. The radius of the second lower die ridge cylindrical surface part 47 is R2–t.

In the second U-shape bending process, the U-shape bending first intermediate molded product 40 held between the U-shape bending second upper die 41 and the U-shape bending second lower die 45 is bent from the ends, and a U-shape bending second intermediate molded product 50 is obtained. The radii of the cylindrical surface part formed at each end of the U-shape bending second intermediate molded product 50 taken out from the dies are defined as r2 and r2–t.

Figure 8C:
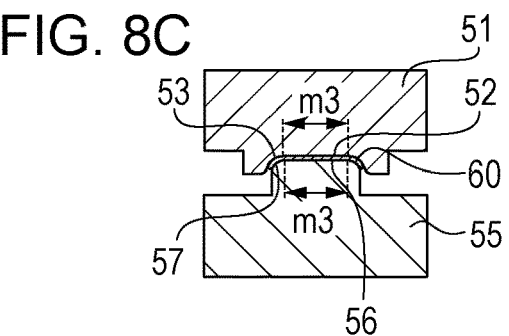

FIG. 8C shows a third U-shape bending process. The third U-shape bending process is a process in which dies for the U-shape bending second intermediate molded product 50 are replaced and the U-shape bending second intermediate molded product 50 is held between a U-shape bending third upper die 51 and a U-shape bending third lower die 55 and pressurized. The U-shape bending third upper die 51 has an axial groove. A third upper die groove flat part 52 extends at the center of the axial groove. A third upper die groove cylindrical surface part 53 extends at each end. The width of the third upper die groove flat part 52 is defined as m3. The value of m3 changes with the number of processes of the U-shape bending process. The radius of the third upper die groove cylindrical surface part 53 is defined as R3.

The U-shape bending third lower die 55 has an axial ridge. A third lower die ridge flat part 56 extends at the center of the axial ridge. A third lower die ridge cylindrical surface part 57 extends at each end. The width of the third lower die ridge flat part 56 is m3 equal to the width of the third upper die groove flat part 52. The radius of the third lower die ridge cylindrical surface part 57 is R3–t.

In the third U-shape bending process, the U-shape bending second intermediate molded product 50 held between the U-shape bending third upper die 51 and the U-shape bending third lower die 55 is bent from the ends, and a U-shape bending third intermediate molded product 60 is obtained. The radii of the cylindrical surface part formed at each end of the U-shape bending third intermediate molded product 60 taken out from the dies are defined as r3 and r3–t.

Figure 8D:
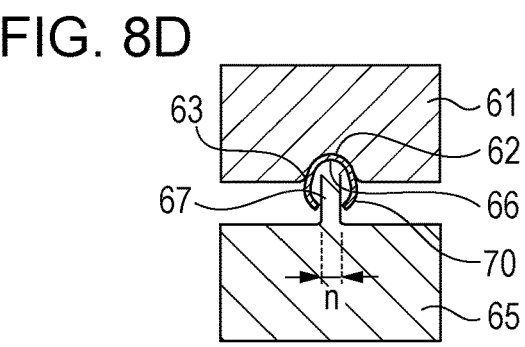

FIG. 8D shows a fourth U-shape bending process that is a center bending process. The fourth U-shape bending process is a process in which dies for the U-shape bending third intermediate molded product 60 are replaced and the U-shape bending third intermediate molded product 60 is held between a U-shape bending fourth upper die 61 and a U-shape bending fourth lower die 65 and pressurized. A fourth upper die cylindrical surface part 62 extends in the axial direction at the center of the U-shape bending fourth upper die 61. The radius of the fourth upper die cylindrical surface part 62 is defined as R4. Each end of the fourth upper die cylindrical surface part 62 is smoothly chamfered as a fourth upper die chamfered part 63 to prevent damage to the U-shape bending third intermediate molded product 60. A fourth lower die projected part 67 having a fourth lower die projected cylindrical surface part 66 extends in the axial direction at the center of the U-shape bending fourth lower die 65. The radius of the fourth lower die projected cylindrical surface part 66 is R4–t.

Through the fourth U-shape bending process, a U-shape bending final molded product 70 is obtained. The U-shape bending final molded product 70 has a cylindrical surface at each of the ends and the center and has a flat surface between each end and the center. The width n of the fourth lower die projected part 67 is set between a lower limit and an upper limit. The lower limit is set to a dimension at which the U-shape bending third intermediate molded product 60 does not break at the time of bending. The upper limit is set to a dimension at which the U-shape bending third intermediate molded product 60 does not interfere with the side face of the fourth lower die projected part 67 when the opening narrows as a result of bending. The radii of the cylindrical surface part formed at the center of the U-shape bending final molded product 70 taken out from the dies are defined as r4 and r4–t.

Next, an O-shape bending process S04 in FIG. 5A will be described. The O-shape bending process S04 is performed by using the U-shape bending final molded product 70.

FIGS. 8E to 8I are views showing the O-shape bending process S04 by using the views of dies and a molded product.

Figure 8E:
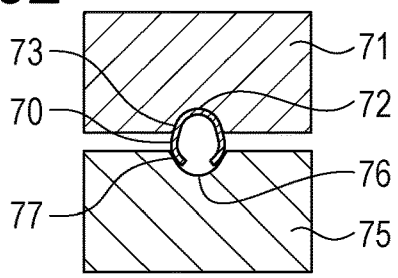

FIG. 8E shows a first O-shape bending process and is a view of a state where the U-shape bending final molded product 70 is placed between an O-shape bending first upper die 71 and an O-shape bending first lower die 75. A groove having an O-shape bending first upper die cylindrical surface part 72 extends in the axial direction at the center of the O-shape bending first upper die 71. A groove having an O-shape bending first lower die cylindrical surface part extends in the axial direction at the center of the O-shape bending first lower die 75. Each end of the O-shape bending first upper die cylindrical surface part 72 has a smoothly chamfered O-shape bending first upper die chamfered part 73. Each end of the O-shape bending first lower die cylindrical surface part has a smoothly chamfered O-shape bending first lower die chamfered part 77. With the O-shape bending first upper die chamfered parts 73 and the O-shape bending first lower die chamfered parts 77, it is possible to prevent damage to the U-shape bending final molded product 70 in a deformation process.

Figure 8F:
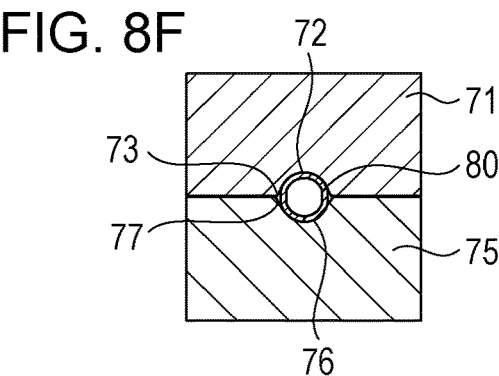

FIG. 8F also shows the first O-shape bending process and is a view of a state where closure of the O-shape bending first upper die 71 and the O-shape bending first lower die 75 is complete. The radius of each of the O-shape bending first upper die 71 and the O-shape bending first lower die 75 is defined as R5.

Through the first O-shape bending process, an O-shape bending intermediate molded product 80 is obtained. The inner peripheral surface of the O-shape bending intermediate molded product 80 has no gap; however, a gap 78 due to a difference in inner and outer perimeters remains at the outer peripheral surface. A gap between the O-shape bending first upper die 71 and the O-shape bending first lower die 75 is adjusted such that the O-shape bending intermediate molded product 80 is not filled into the space sandwiched by the O-shape bending first upper die chamfered part 73 and the O-shape bending first lower die chamfered part 77. Therefore, the O-shape bending intermediate molded product 80 has not a cylindrical shape but a vertically-long flat sectional shape. When the O-shape bending intermediate molded product 80 is taken out from the dies, the gap 78 expands due to elastic recovery, and an O-shape bending intermediate molded product 85 is obtained. The radii of the cylindrical surface part formed at the center of the O-shape bending intermediate molded product 85 are defined as r5 and r5–t.

Figure 8G:
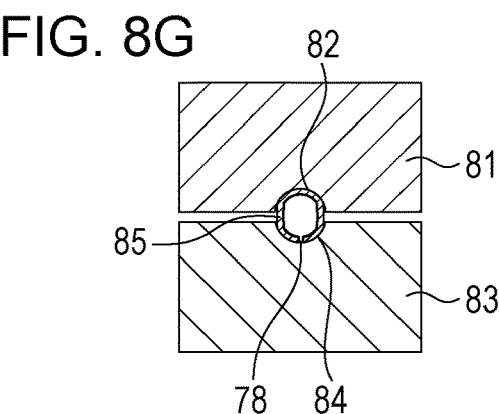

FIG. 8G shows a second O-shape bending process and is a view of a state where the dies are replaced and the O-shape bending intermediate molded product 85 is placed between an O-shape bending second upper die 81 and an O-shape bending second lower die 83. A groove having an O-shape bending second upper die cylindrical surface part 82 extends in the axial direction at the center of the O-shape bending second upper die 81. Furthermore, a groove having an O-shape bending second lower die cylindrical surface part 84 extends in the axial direction at the center of the O-shape bending second lower die 83.

Since the width of the O-shape bending intermediate molded product 85 is set so as to be less than the aperture width between the O-shape bending second upper die cylindrical surface part 82 and the O-shape bending second lower die cylindrical surface part 84, the O-shape bending intermediate molded product 85 does not enter between the O-shape bending second upper die 81 and the O-shape bending second lower die 83 as a result of bending. The radius of each of the O-shape bending second upper die cylindrical surface part 82 and the O-shape bending second lower die cylindrical surface part 84 is defined as R6.

Figure 8H:
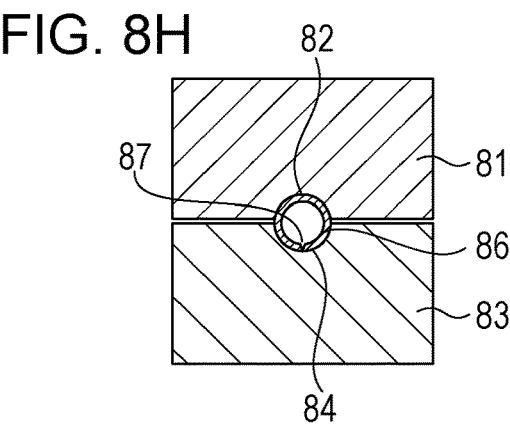

In FIG. 8H, the O-shape bending second upper die 81 and the O-shape bending second lower die 83 are closed, deformation of the O-shape bending intermediate molded product 85 advances, and an O-shape bending intermediate molded product 86 is obtained. At this time point, the molded product has no gap on the outer peripheral surface and reaches a state where an O-shape bending intermediate molded product opening 87 is provided at the inner peripheral surface. At this time, the O-shape bending second upper die 81 and the O-shape bending second lower die 83 are still not in contact with each other.

Figure 8I:
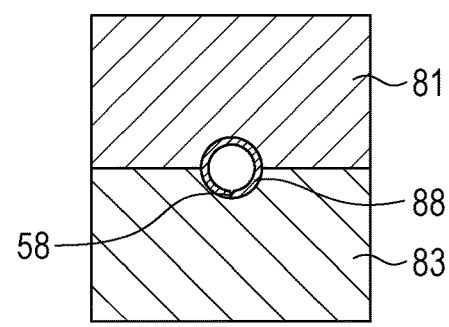

FIG. 8I shows a state where the O-shape bending second upper die 81 and the O-shape bending second lower die 83 are in contact with each other. In the O-shape bending intermediate molded product 86, the O-shape bending intermediate molded product opening 87 reduces, and the contact area 58 is produced on the outer peripheral surface side. Through the second O-shape bending process, an O-shape bending final molded product 88 is obtained. The O-shape bending final molded product 88 is taken out from the dies, and the metal cylindrical member 3 is obtained. The radius of the metal cylindrical member 3 becomes r0 that is a target value of a conveying roller due to elastic recovery.

Even when elastic recovery occurs, the contact area 58 does not separate.

This is because compressive residual stress occurs in the contact area 58 through the O-shape bending process, the contact area 58 does not separate after being taken out from the dies.

Depending on conditions, a deflection slightly occurs in the O-shape bending final molded product 88 at a location at which the contact area 58 intersects with the O-shape bending second lower die cylindrical surface part 84, and the O-shape bending second lower die cylindrical surface part 84 and the O-shape bending final molded product 88 can be separated. At this time, after bending, the outer peripheral surface 7 of the metal cylindrical member 3 can be ground as finishing.

Figure 7C:
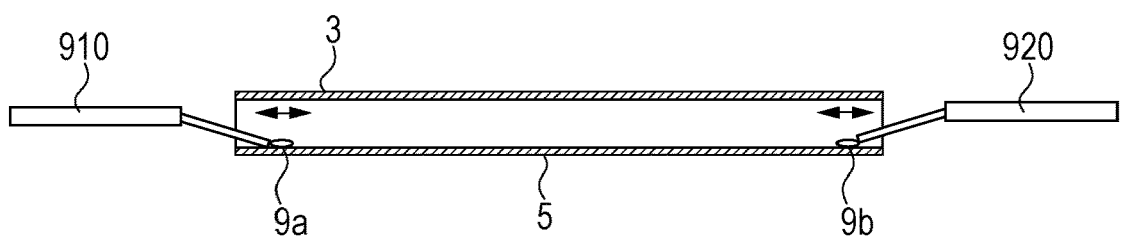

After the end of the second O-shape bending process, the O-shape bending final molded product 88 is taken out from the dies, and the metal cylindrical member 3 is obtained. The metal cylindrical member 3 is coated with the additional member 79, then adhesive that will be the adhesive member 9 is applied to the taper groove formed on the inner peripheral surface side, and the adhesive is cured, with the result that the cylindrical body 2 is obtained. FIG. 7C shows an example of a bonding process. Adhesive is applied to the bonding portion 5 by inserting a nozzle 910 from one opening of the cylindrical member 3 and discharging the adhesive from the nozzle 910 to form the adhesive member 9a shown in FIG. 4C. In addition, adhesive is applied to the bonding portion 5 by inserting a nozzle 920 from the other opening of the cylindrical member 3 and discharging the adhesive from the nozzle 920 to form the adhesive member 9b shown in FIG. 4C. Here, since the two nozzles 910, 920 are used, the adhesive members 9a, 9b are able to be formed at the same time. The adhesive members 9a, 9b may be sequentially formed with a single nozzle.

Next, the correlation among R1 to R6, and r0 to r5 is shown. Initially, R6 satisfies the expression 1 in consideration of elastic recovery of bending.

$$R6 = k6r0 \text{ where } k6 \leq 1 \qquad \text{Expression 1}$$

k6 is the coefficient of the amount of elastic recovery and changes depending on the material and shape of the metal cylindrical member 3. k6 is determined by obtaining the ratio among the radii of the O-shape bending second upper die cylindrical surface part 82, the O-shape bending second lower die cylindrical surface part 84, and the bent metal cylindrical member 3 in advance.

Subsequently, the expression 2 is satisfied such that the O-shape bending intermediate molded product 85 does not enter between the O-shape bending second upper die 81 and the O-shape bending second lower die 83.

$$R6 > r5 \qquad \text{Expression 2}$$

Subsequently, R5 satisfies the expression 3 in consideration of elastic recovery.

$$R5 = k5r5 \text{ where } k5 \leq 1 \qquad \text{Expression 3}$$

k5 is the coefficient of the amount of elastic recovery and changes depending on the material and shape of the metal cylindrical member 3. k5 is determined by obtaining the ratio among the radii of the O-shape bending first upper die cylindrical surface part 72, the O-shape bending first lower die cylindrical surface part 76, and the O-shape bending intermediate molded product 85 in advance.

Subsequently, the expression 4 is satisfied such that the U-shape bending final molded product 70 does not enter between the O-shape bending first upper die 71 and the O-shape bending first lower die 75.

$$R5 > r4 \qquad \text{Expression 4}$$

Subsequently, R4 satisfies the expression 5 in consideration of elastic recovery.

$$R4 = k4r4 \text{ where } k4 \leq 1 \qquad \text{Expression 5}$$

k4 is the coefficient of the amount of elastic recovery and changes depending on the material and shape of the metal cylindrical member 3. k4 is determined by obtaining the ratio among the radii of the U-shape bending fourth upper die 61, the U-shape bending fourth lower die 65, and the U-shape bending final molded product 70 in advance.

Subsequently, the expression 6 is satisfied such that the U-shape bending third intermediate molded product 60 is stably placed in position and bent between the U-shape bending fourth upper die 61 and the fourth lower die projected part 67.

$$R4 < r3 \qquad \text{Expression 6}$$

Subsequently, the following expression is satisfied in the first to third U-shape bending processes.

$$R1 = R2 = R3 \qquad \text{Expression 7}$$

$$r1 = r2 = r3 \qquad \text{Expression 8}$$

Subsequently, R1 satisfies the expression 9 in consideration of elastic recovery.

$$R1 = k1 r1 \text{ where } k1 \leq 1 \qquad \text{Expression 9}$$

The expression 10 is satisfied from the order of processes.

$$m1 > m2 > m3 \qquad \text{Expression 10}$$

In addition, m1, m2, and m3 are determined such that the end faces 10, 20 of the U-shape bending third intermediate molded product 60 do not contact with the fourth lower die projected part 67 in the subsequent fourth U-shape bending process.

As described above, the cylindrical body 2 is able to be manufactured.

Figure 5B:
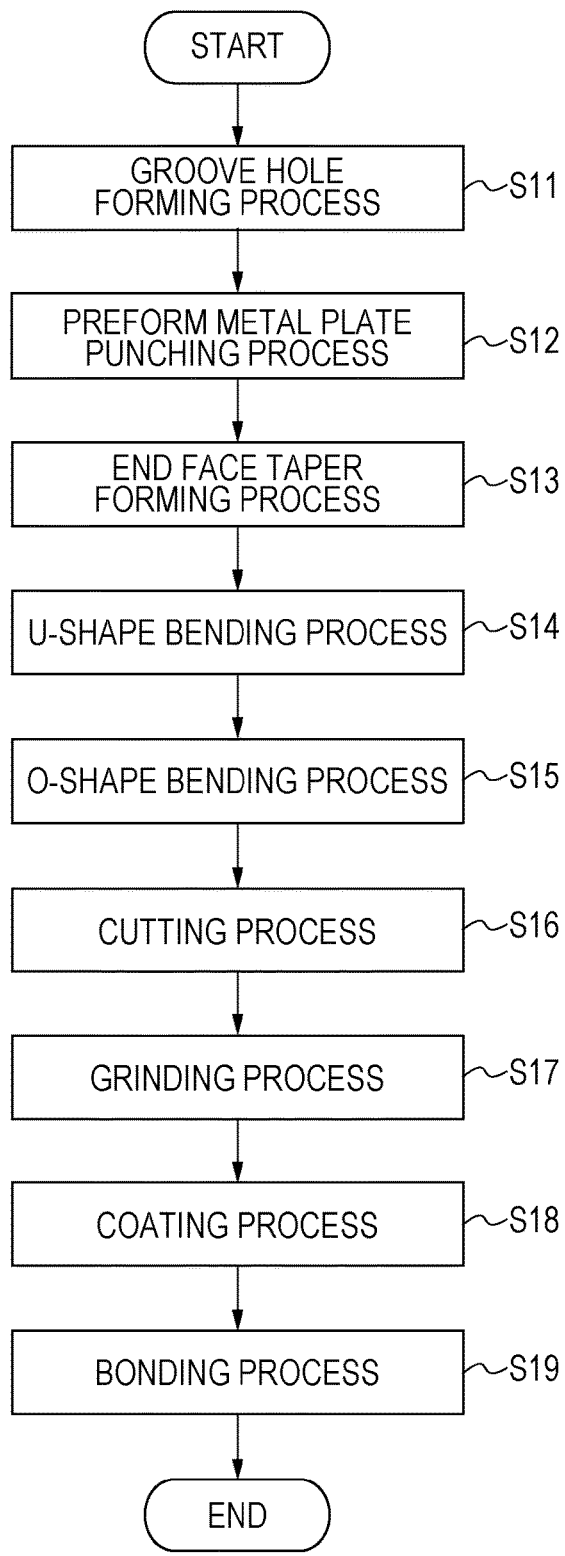

FIG. 5B is a process chart in a second manufacturing method. The description will be made with reference to FIG. 9. In the second manufacturing method, a cylindrical member is successively manufactured from a metal continuous sheet material rolled in a coil shape. FIG. 9 is a schematic diagram in which dies and a molding machine are omitted and only the shape of a molded product is extracted for the sake of illustration of the second manufacturing method. FIG. 9 shows a state until a metal cylindrical member 3 is obtained from a metal continuous sheet material 101.

In a groove hole forming process S11, positioning holes 102 and chamfered grooves 103 are formed in the metal continuous sheet material 101 that is a raw material.

In a preform metal plate punching process S12, the metal continuous sheet material 101 is punched at locations corresponding to the positioning holes 102 to obtain a preform metal plate 1*d*. The preform metal plate 1*d* is continuous with holding frames 104 via connecting portions 105 easily cuttable later. Through the punching process, the chamfered grooves 103 formed in the process S11 are formed so as to be located at each end face of the preform metal plate 1*d*.

In an end face taper forming process S13, a taper shape is formed on each of the contact-side end faces of the preform metal plate 1*d*. By cutting off the contact-side end faces while clamping the preform metal plate 1*d* in a direction opposite to the bending direction of cylinder forming with a pair of dies, a taper shape is formed at each of the end faces of the metal plate.

A case of a single process is described this time; however, the configuration is not limited thereto. For example, a method of forming end faces while clamping the end faces with a pair of dies is also conceivable. In this way, the metal plate 1 is formed.

In a U-shape bending process S14, a U-shape bending first intermediate molded product 40, a U-shape bending second intermediate molded product 50, a U-shape bending third intermediate molded product 60, and a U-shape bending final molded product 70 are obtained through three-step end bending processes and a one-step center bending process.

In an O-shape bending process S15, an O-shape bending intermediate molded product 80 and an O-shape bending final molded product 88 are obtained through two-step O-shape bending processes.

In a cutting process S16, the O-shape bending final molded product 88 is separated from the holding frames 104 by cutting the connecting portions 105 to obtain a cylinder molded product 89.

In a grinding process S17, the outer peripheral surface of the cylinder molded product 89 separated from the holding frames 104 is finished by grinding to obtain a cylindrical member 3.

In a coating process S18, the cylindrical member 3 of which the outer peripheral surface is finished by grinding is coated with the additional member 79.

In a bonding process S19, adhesive is applied to the taper part on the inner peripheral surface of the cylindrical member 3.

As described above, the cylindrical body 2 is able to be manufactured.

The cylindrical body 2 is able to be adopted into various apparatuses. The apparatus that includes the cylindrical body 2 can include at least any one of a mechanical component, an optical component, and an electronic component. The mechanical component is, for example, a motor or a gear. The optical component is, for example, a lens, a mirror, an image sensor, or a display. The electronic component is, for example, a processor or a memory. Various apparatuses can be electronic devices, such as a computer, and transport devices, such as a vehicle, a ship, and an airplane. Various apparatuses can be medical equipment, such as radiological diagnostic equipment, ultrasonic diagnostic equipment, and endoscope, business equipment, such as a printer and a scanner, industrial equipment, such as a semiconductor manufacturing apparatus and a robot, and other equipment. The cylindrical body 2 of the present embodiment is not only used as a component in a complicated apparatus that includes a mechanical component, an optical component, an electronic component, or the like, but also as a pipe of various uses in clothing, food, and housing.

Figure 10A:
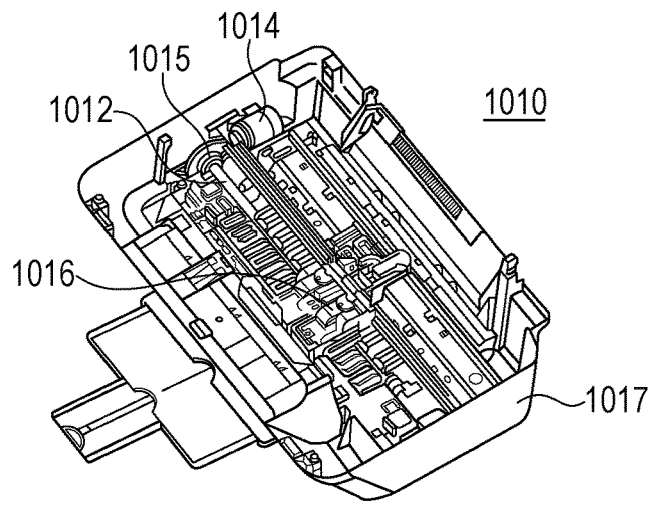
FIGS. 10A to 10C are schematic diagrams respectively illustrating apparatuses.

FIG. 10A is a perspective view schematically showing the inside of a printing apparatus 1010. The printing apparatus 1010 includes a conveying roller 1012. The printing apparatus 1010 includes a motor 1014 and a mechanical component 1015. The mechanical component 1015 is a transmission mechanism that transmits the power of the motor 1014 to the conveying roller 1012 and is fixed to the conveying roller 1012. The rotation of the motor 1014 is transmitted to the conveying roller 1012 via the mechanical component 1015, and the conveying roller 1012 rotates around the central axis of the cylindrical member 3 included in the conveying roller 1012.

As shown in FIG. 4D, in the conveying roller 1012, the additional member 79 is attached to the outer periphery of the cylindrical member 3. The additional member 79 of this embodiment is a ceramic layer for making it easy to convey a recording medium by increasing the friction coefficient. Paper or the like that is a recording medium is conveyed by the conveying roller 1012. Ink is injected by an ink head 1016.

In an ink-jet printer that records information, such as characters and images, by injecting ink to paper or the like that is a recording medium, a roller for conveying paper or the like is used at various locations. Among others, the conveying roller is a roller that rotates to accurately convey recording paper to a predetermined print position. The conveying roller extends in a direction orthogonal to a paper feeding direction of a paper feeding unit and in a horizontal direction and has a cylindrical shape. The conveying roller is rotatably supported by a pair of substantially U-shaped bearings (not shown) provided at a conveying unit. The conveying roller rotates when driven by a drive portion. Because the conveying roller influences printing accuracy, high outside diameter, roundness, vibration accuracy, and durability are desired. A conveying roller that conveys paper or the like needs to convey paper or the like with high positioning accuracy. For this purpose, a conveying roller is desired to have high roundness, torsional strength, and durability.

A metal round bar has been used as the material of a roller, serving as a material that satisfies those requirements. However, there is an inconvenience that a metal round bar is heavy in weight and high in cost, so a reduction in weight and cost has been studied.

By using the above-described cylindrical body 2 as the conveying roller 1012, a reduction in weight and cost is achieved while torsional strength and durability are ensured.

Here, an example in which the cylindrical body 2 is applied to the conveying roller of an ink-jet printer serving as a printing apparatus has been described. Alternatively, the cylindrical body 2 may be applied to various rollers and drums of a laser beam printer serving as a printing apparatus.

Figure 10B:
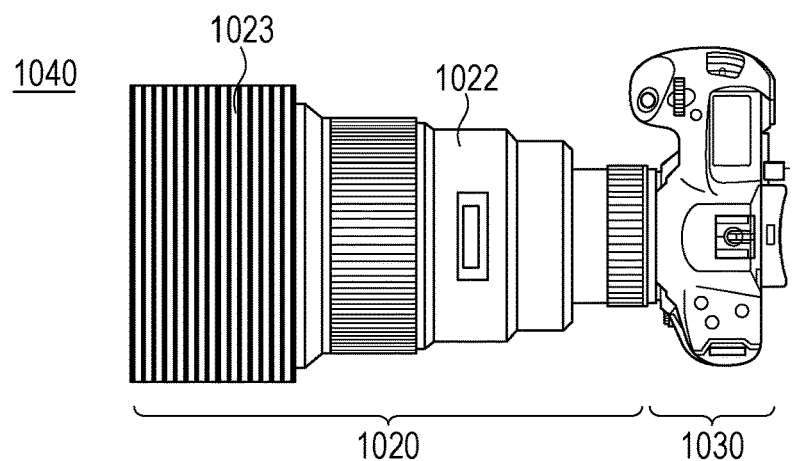

FIG. 10B shows a camera system 1040 that includes an optical instrument 1020 and an image capture apparatus 1030. The optical instrument 1020 can include, for example, a lens hood 1023, a lens barrel 1022, and a lens (not shown). The cylindrical body 2 may be applied to the lens hood 1023 or the lens barrel 1022.

Figure 10C:
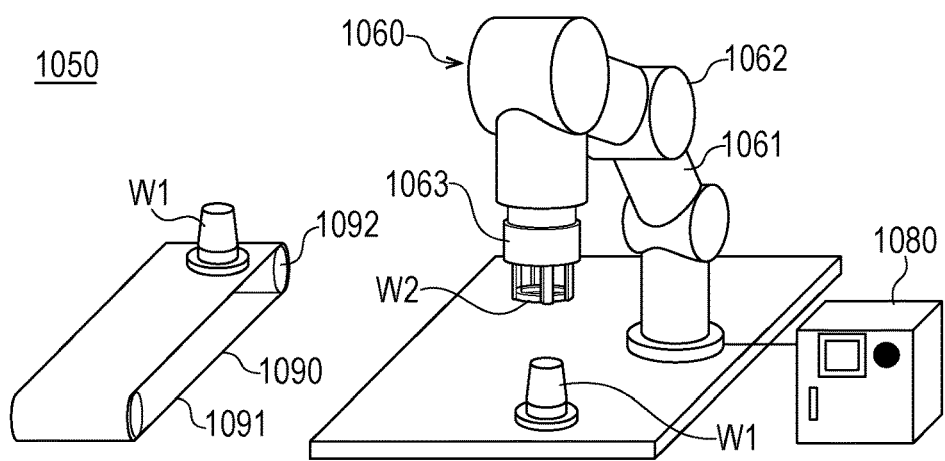

FIG. 10C shows a production system 1050 that includes a robot 1060, a controller 1080 that controls the robot 1060, and a belt conveyer 1090 that conveys an article. The robot 1060 includes a robot arm 1061, a joint 1062, and a robot hand 1063. The robot 1060 is gripping a workpiece W2 with the robot hand 1063 and is assembling a workpiece W2 to a workpiece W1. The above-described cylindrical body 2 may be used as the exterior body of the robot arm 1061. The belt conveyer 1090 includes a conveying roller 1092 and a belt 1091. The belt conveyer 1090 conveys the workpiece W1. The above-described cylindrical body 2 may be used for the conveying roller 1092.

The above-described embodiment may be modified as needed without departing from the technical idea. For example, a plurality of embodiments may be combined. The matter of part of at least one embodiment may be deleted or replaced. A new matter may be added to at least one embodiment.

The disclosed content of the specification includes not only the ones explicitly described in the specification but also all the matter that can be understood from the specification and the drawings attached to the specification. For example, selected combinations of described matters are also the disclosed content of the specification. For example, when there are a description that "A is greater than or equal to B" and a description "C is less than or equal to D", the mode that "A is greater than or equal to B and C is less than or equal to D" is the disclosed content of the specification. In the specification, the situation that "A is greater than or equal to B" (A is a selected element and B is a selected index) means that "A is equal to B or A is greater than B. The situation that "C is less than or equal to D" (C is a selected element and D is a selected index) means that "C is equal to D or C is less than D (less than C)". The disclosed content of the specification includes complements of individual concepts described in the specification. In other words, when, for example, "E is F" is described in the specification, even if the description that "E is not F" is omitted, the specification may be regarded describing that "E is not F". This is because, when "E is F", it is assumed that the case "E is not F" is considered.

According to the embodiments of the present disclosure, it is possible to provide a technology advantageous in improving the strength of a cylindrical body.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-161937 filed Sep. 30, 2021, which is hereby incorporated by reference herein in its entirety.

What is claimed is:

1. A cylindrical body comprising:
a cylindrical member made by forming a metal plate, the metal plate having a first end face, a second end face, a third end face, and a fourth end face, into a cylindrical shape such that the first end face and the second end face of the metal plate face each other;
a nonmetallic first adhesive member bonding the first end face to the second end face; and
a second adhesive member, wherein
the first adhesive member is disposed between a first part of the first end face and a second part of the second end face, and the first part and the second part are not parallel to each other, and
the first adhesive member is bonded to a portion of an inner peripheral surface of the cylindrical member,
the third end face and the fourth end face are in an axial direction of the cylindrical member,
a distance between the third end face and the fourth end face is greater than an outside diameter of the cylindrical member,
the second adhesive member is bonded to a third part away from the first part of the first end face and a fourth part away from the second part of the second end face in the cylindrical member,
the second adhesive member of the third part and the second adhesive member of the fourth part are not continuous with each other,
the second adhesive member of the third party is disposed away from the third end face, and
the second adhesive member of the fourth part is disposed away from the fourth end face.

2. The cylindrical body according to claim 1, wherein the third part of the first end face is in contact with the fourth part of the second end face, a length of a contact area in which the first end face and the second end face are in contact with each other in a radial direction of the cylindrical member is greater than or equal to 50% of the thickness of the cylindrical member.

3. The cylindrical body according to claim 1, wherein a width of the first adhesive member between the first end face and the second end face in a circumferential direction of the cylindrical member is less than a length of the first adhesive member between the first end face and the second end face in a radial direction of the cylindrical member.

4. The cylindrical body according to claim 1, wherein the cylindrical member has a metal containing part that contains metal that is any one of iron, copper, magnesium, and aluminum, and the first adhesive member is in contact with the metal containing part or a film of a chemical compound of the metal, covering the metal containing part.

5. The cylindrical body according to claim 1, wherein the first adhesive member is disposed away from the fourth end face.

6. The cylindrical body according to claim 1, wherein at least one of a third end face and a fourth end face of the cylindrical member has protrusions and recesses.

7. The cylindrical body according to claim 1, further comprising a nonmetallic additional member covering an outer peripheral surface of the cylindrical member, wherein the first end face and the second end face are located between the first adhesive member and the additional member in a radial direction of the cylindrical member.

8. An apparatus comprising:
the cylindrical body according to claim 1; and
at least any one of a mechanical component, an optical component, and an electronic component.

9. The apparatus according to claim 8, further comprising a machine fixed to the cylindrical body, wherein the machine is provided such that the cylindrical body rotates about an axis of the cylindrical member.

10. The apparatus according to claim 8, wherein the cylindrical body is a conveying roller arranged to transport an article.

11. A cylindrical body comprising:
a cylindrical member made by forming a metal plate, the metal plate having a first end face, a second end face, a third end face, and a fourth end face, into a cylindrical shape such that the first end face and the second end face of the metal plate face each other;
a nonmetallic first adhesive member bonding the first end face to the second end face; and
a second adhesive member, wherein
the first adhesive member is disposed between a first part of the first end face and a second part of the second end face, and a third part of the first end face is in contact with a fourth part of the second end face,
the third end face and the fourth end face are in an axial direction of the cylindrical member,
a distance between the third end face and the fourth end face is greater than an outside diameter of the cylindrical member,
the second adhesive member is bonded to the third part away from the first part of the first end face and the fourth part away from the second part of the second end face in the cylindrical member,
the second adhesive member of the third part and the second adhesive member of the third part are not continuous with each other,
the second adhesive member of the third part is disposed away from the third end face, and
the second adhesive member of the fourth part is disposed away from the fourth end face.

12. The cylindrical body according to claim 11, wherein the first adhesive member and a contact area in which the first end face and the second end face are in contact with each other are arranged in a radial direction of the cylindrical member.

13. The cylindrical body according to claim 11, wherein a length of a contact area in which the first end face and the second end face are in contact with each other in a radial direction of the cylindrical member is greater than a length of the first adhesive member between the first end face and the second end face.

14. The cylindrical body according to claim 13, wherein the length of the contact area is greater than or equal to twice the length of the first adhesive member and less than or equal to four times the length of the first adhesive member.

15. The cylindrical body according to claim 13, wherein the length of the contact area is greater than a width of the first adhesive member between the first end face and the second end face in a circumferential direction of the cylindrical member.

16. The cylindrical body according to claim 15, wherein a difference between the inside diameter of the cylindrical member and the outside diameter of the cylindrical member is greater than or equal to 1 mm and less than or equal to 4 mm, the length of the contact area is greater than or equal to 0.5 mm and less than or equal to 1.5 mm, the length of the first adhesive member is greater than or equal to 0.1 mm and less than or equal to 0.5 mm, and the width of the first adhesive member is greater than or equal to 0.1 mm and less than or equal to 0.5 mm.

17. The cylindrical body according to claim 11, wherein the first adhesive member is bonded to a portion of an inner peripheral surface of the cylindrical member.

18. An apparatus comprising:
the cylindrical body according to claim 11; and
at least any one of a mechanical component, an optical component, and an electronic component.

19. The apparatus according to claim 18, further comprising a machine fixed to the cylindrical body, wherein the machine is provided such that the cylindrical body rotates about an axis of the cylindrical member.

20. The apparatus according to claim 18, wherein the cylindrical body is a conveying roller arranged to transport an article.

21. A cylindrical body comprising:
a cylindrical member made by forming a metal plate, the metal plate having a first end face, a second end face, a third end face, and a fourth end face, into a cylindrical shape such that the first end face and the second end face of the metal plate face each other;
a nonmetallic first adhesive member bonding the first end face to the second end face, and
a second adhesive member, wherein
a distance from a boundary between the first end face and an inner peripheral surface of the cylindrical member to a boundary between the second end face and the inner peripheral surface of the cylindrical member is greater than a distance from a boundary between the first end face and an outer peripheral surface of the cylindrical member to a boundary between the second end face and the outer peripheral surface of the cylindrical member,
the third end face and the fourth end face are in an axial direction of the cylindrical member,
a distance between the third end face and the fourth end face is greater than an outside diameter of the cylindrical member,
the second adhesive member is bonded to a third part away from the first part of the first end face and a fourth part away from the second part of the second end face in the cylindrical member,
the second adhesive member of the third part and the second adhesive member of the fourth part are not continuous with each other,
the second adhesive member of the third part is disposed away from the third end face, and
the second adhesive member of the fourth part is disposed away from the fourth end face.

* * * * *